United States Patent
Kang et al.

(10) Patent No.: US 10,645,493 B2
(45) Date of Patent: May 5, 2020

(54) SOUND DIRECTION DETECTION SENSOR AND ELECTRONIC APPARATUS INCLUDING THE SAME

(71) Applicant: SAMSUNG ELECTRONICS CO., LTD., Suwon-si (KR)

(72) Inventors: Sungchan Kang, Hwaseong-si (KR); Cheheung Kim, Yongin-si (KR); Yongseop Yoon, Seoul (KR); Choongho Rhee, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/262,065

(22) Filed: Jan. 30, 2019

(65) Prior Publication Data
US 2020/0068302 A1    Feb. 27, 2020

(30) Foreign Application Priority Data
Aug. 21, 2018    (KR) .................. 10-2018-0097562

(51) Int. Cl.
*H04R 1/32*    (2006.01)
*H04R 3/00*    (2006.01)
*H04R 1/40*    (2006.01)

(52) U.S. Cl.
CPC ............ *H04R 3/005* (2013.01); *H04R 1/406* (2013.01)

(58) Field of Classification Search
CPC ... H04R 1/00; H04R 1/02; H04R 1/20; H04R 1/32; H04R 1/326; H04R 1/406; H04R 3/00; H04R 3/005; H04R 17/00; H04R 17/02; H04R 17/10; H04R 21/00;
(Continued)

(56) References Cited

U.S. PATENT DOCUMENTS

| 5,625,697 A | 4/1997 | Bowen et al. |
| 7,716,044 B2 | 5/2010 | Kobayashi et al. |
| 2009/0323474 A1 | 12/2009 | Lin |

(Continued)

FOREIGN PATENT DOCUMENTS

| EP | 3279622 A1 | 2/2018 |
| EP | 3451011 A1 | 3/2019 |

(Continued)

OTHER PUBLICATIONS

Anonymous, "Microphone Array Beamforming", 2013, InvenSense, Application note AN-1140, 12 pages total.

(Continued)

*Primary Examiner* — Thang V Tran
(74) *Attorney, Agent, or Firm* — Sughrue Mion, PLLC

(57) ABSTRACT

Provided are sound direction detection sensors capable of detecting an input direction of sound and electronic apparatuses including the same. A sound direction detection sensor includes a sound inlet receiving input sound, a sound outlet outputting the sound input through the sound inlet, and a plurality of directional vibrators arranged between the sound inlet and the sound outlet in such a manner that at least one directional vibrator selectively reacts based on a direction of the sound input through the sound inlet, wherein a direction perpendicular to a direction of a directional vibrator having a lowest output in magnitude among the plurality of directional vibrators is determined as an input direction of the sound.

25 Claims, 19 Drawing Sheets

(58) Field of Classification Search
CPC ........ H04R 21/02; H04R 23/00; H04R 29/00;
B06K 35/00; B06K 2370/00
See application file for complete search history.

(56) References Cited

U.S. PATENT DOCUMENTS

| | | | |
|---|---|---|---|
| 2010/0226522 A1* | 9/2010 | Horibe | H04M 1/19 381/356 |
| 2011/0172996 A1* | 7/2011 | Takano | G10L 21/0208 704/225 |
| 2013/0315034 A1* | 11/2013 | Yagihashi | H04R 1/32 367/103 |
| 2014/0084395 A1 | 3/2014 | Sparks et al. | |
| 2016/0291117 A1 | 10/2016 | Hui | |
| 2017/0125037 A1 | 5/2017 | Shin | |
| 2019/0072635 A1* | 3/2019 | Kang | G10K 11/1781ke |
| 2019/0174244 A1 | 6/2019 | Kim et al. | |
| 2019/0348050 A1 | 11/2019 | Kim et al. | |

FOREIGN PATENT DOCUMENTS

| | | |
|---|---|---|
| GB | 2279729 A | 1/1995 |
| JP | 3720795 B2 | 11/2005 |
| KR | 10-2017-0050908 A | 5/2017 |
| KR | 10-2019-0067289 A | 6/2019 |
| WO | 2018124590 A1 | 7/2018 |

OTHER PUBLICATIONS

Wilmott, et al., "Bio-Inspired Miniature Direction Finding Acoustic Sensor", Jul. 21, 2016, Scientific Reports, vol. 6, Article No. 29957, pp. 1-8.

Communication dated Jan. 10, 2020, from the European Patent Office in counterpart European Application No. 19171991.3.

* cited by examiner

SOUND DIRECTION DETECTION SENSOR AND ELECTRONIC APPARATUS INCLUDING THE SAME

CROSS-REFERENCE TO RELATED APPLICATION

This application claims priority from Korean Patent Application No. 10-2018-0097562, filed on Aug. 21, 2018, in the Korean Intellectual Property Office, the disclosure of which is incorporated herein in its entirety by reference.

BACKGROUND

1. Field

The present disclosure relates to sound direction detection sensors, and more particularly, to sound direction detection sensors capable of detecting an input direction of sound by using a plurality of directional vibrators, and electronic apparatuses including the same.

2. Description of the Related Art

Usability of sensors mounted in home appliances, image display apparatuses, virtual reality apparatuses, augmented reality apparatuses, artificial intelligence speakers, etc., for sound direction detection and voice recognition is increasing. In general, a sound direction detection sensor calculates an input direction of sound by using a difference in times at which the sound reaches a plurality of omnidirectional acoustic sensors. When the plurality of omnidirectional acoustic sensors are used, they need to be spaced apart from each other by a sufficient distance to detect the temporal difference. An angular resolution of the sound direction detection sensor is determined based on the distance between the plurality of omnidirectional acoustic sensors and a sampling frequency, and may decrease when the distance and the sampling frequency increase.

SUMMARY

According to an aspect of an embodiment, a sound direction detection sensor may include a sound inlet configured to receive sound, a sound outlet configured to output the sound that is input through the sound inlet, and a plurality of directional vibrators arranged between the sound inlet and the sound outlet. At least one directional vibrator of the plurality of directional vibrators may selectively react based on a direction of the sound that is input through the sound inlet. An input direction of the sound may be determined to be perpendicular to a direction of a directional vibrator having a lowest output in magnitude among the plurality of directional vibrators.

A first magnitude of a first output of a first directional vibrator located at a first position at a +90° offset from the direction of the directional vibrator having the lowest output in magnitude may be compared to a second magnitude of a second output of a second directional vibrator located at a second position at a −90° offset from the direction of the directional vibrator having the lowest output in magnitude. A direction of one of the first and second directional vibrators having a greater output in magnitude, may be determined to be the input direction of the sound.

Each of the first magnitude and the second magnitude may be represented by a root-mean-square (RMS) of a vibration waveform of a respective one of the first directional vibrator and the second directional vibrator.

The first magnitude and the second magnitude may be compared to a threshold value. The sound may be classified as noise when the first magnitude and the second magnitude are less than the threshold value.

The sound direction detection sensor may further include an omnidirectional vibrator configured to react to the sound regardless of the input direction of the sound.

Phases of a first directional vibrator located at a first position at a +90° offset from the direction of the directional vibrator having the lowest output in magnitude and a second directional vibrator located at a second position at a −90° offset from the direction of the directional vibrator having the lowest output in magnitude may be compared to a phase of the omnidirectional vibrator. A direction of a directional vibrator, among the first directional vibrator and the second directional vibrator, having a phase closer to the phase of the omnidirectional vibrator may be determined to be the input direction of the sound.

The plurality of directional vibrators and the omnidirectional vibrator may be arranged on a same plane with each other. The plurality of directional vibrators may be arranged to surround the omnidirectional vibrator.

The plurality of directional vibrators may be arranged on a same plane with each other and may be arranged to surround a center point on the same plane that is perpendicular to a central axis located at the sound inlet.

The plurality of directional vibrators may be arranged to have symmetry with respect to the center point.

The sound outlet may be provided to face all the plurality of directional vibrators.

The sound outlet may include a plurality of sound outlets respectively facing the plurality of directional vibrators.

The plurality of directional vibrators may have a uniform resonant frequency.

The plurality of directional vibrators may have non-uniform resonant frequencies.

The plurality of directional vibrators may be grouped into a plurality of subgroups representing different directions. Each of the plurality of subgroups may include directional vibrators having non-uniform resonant frequencies.

The plurality of directional vibrators in each of the plurality of subgroups may be arranged in an order of resonant frequencies.

According to another aspect of an embodiment, a sound direction detection method may include receiving input sound by using a plurality of directional vibrators arranged in such a manner that at least one directional vibrator selectively reacts based on a direction of the sound; identifying a directional vibrator having a lowest output in magnitude among the plurality of directional vibrators; and determining an input direction of the input sound to be perpendicular to a direction of the directional vibrator having the lowest output in magnitude.

The receiving the input sound by using the plurality of directional vibrators may include calculating a root-mean-square (RMS) of a vibration waveform of each directional vibrator. A magnitude of an output of each directional vibrator may be the RMS of the vibration waveform of each directional vibrator.

The determining the input direction of the sound may include selecting a first directional vibrator located at a first position at a +90° offset from the direction of the directional vibrator having the lowest output in magnitude, and a second directional vibrator located at a second position at a −90° offset from the direction of the directional vibrator having the lowest output in magnitude; comparing a first magnitude of a first output of the first directional vibrator with a second magnitude of a second output of the second directional vibrator; and determining a direction of one of the first and second directional vibrators, having a greater output in magnitude to be the input direction of the sound.

The sound direction detection method may further include comparing the first magnitude and the second magnitude to a threshold value, and classifying the input sound as noise when the first magnitude and the second magnitude are less than the threshold value.

The sound direction detection method may further include receiving the input sound by using an omnidirectional vibrator that reacts to the input sound regardless of the input direction of the input sound.

The determining the input direction of the input sound may include selecting a first directional vibrator located at a first position at a +90° offset from the direction of the directional vibrator having the lowest output in magnitude, and a second directional vibrator located at a second position at a −90° offset from the direction of the directional vibrator having the lowest output in magnitude; comparing phases of the first directional vibrator and the second directional vibrator to a phase of the omnidirectional vibrator; and determining a direction of a directional vibrator, among the first directional vibrator and the second directional vibrator, having a phase closer to the phase of the omnidirectional vibrator to be the input direction of the input sound.

According to another aspect of an embodiment, an Internet of things (IoT) apparatus may include a sound direction detection sensor configured to receive a voice signal provided by a user, a memory configured to store one or more application modules, and a processor configured to execute the one or more application modules.

According to another aspect of an embodiment, a vehicle voice interface apparatus may include a sound direction detection sensor, and a valid signal extraction module configured to determine whether a signal received by the sound direction detection sensor is a valid signal, based on a direction of the signal and transmit the signal to a vehicle control module upon determining that the signal is the valid signal.

According to another aspect of an embodiment, a spatial recording apparatus may include a sound direction detection sensor, a processor configured to determine an input direction of sound that is input to the sound direction detection sensor, by analyzing a signal detected by the sound direction detection sensor, and a memory configured to store programs for signal processing operations of the processor and execution results of the processor.

According to another aspect of an embodiment, an omnidirectional camera includes a sound direction detection sensor, an omnidirectional photographing module, a processor configured to control the sound direction detection sensor and the omnidirectional photographing module in such a manner that a directional sound signal detected by the sound direction detection sensor matches an omnidirectional image signal captured by the omnidirectional module, and a memory configured to store the directional sound signal and the omnidirectional image signal.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
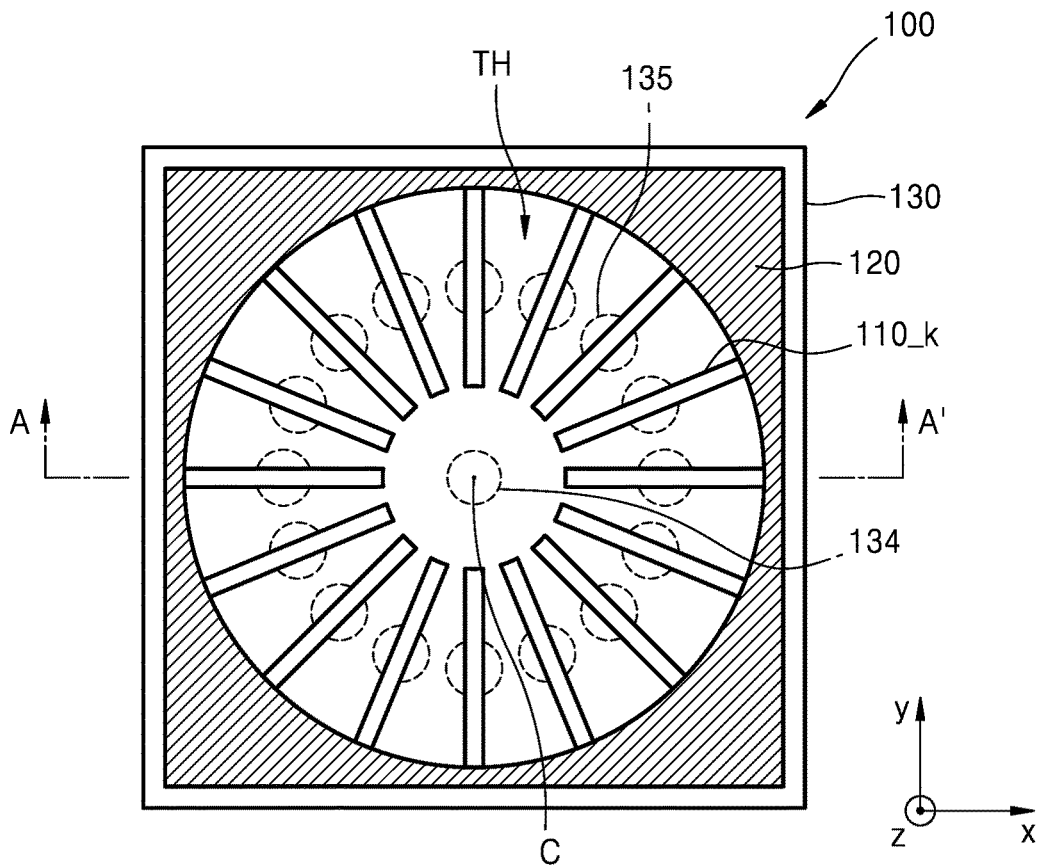
FIG. 1 is a plan view of a sound direction detection sensor according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. It will be understood that when a layer is referred to as being "on" another layer or substrate, it can be directly on the other layer or substrate, or intervening layers may also be present. Expressions such as "at least one of," when preceding a list of elements, modify the entire list of elements and do not modify the individual elements of the list.

Figure 2:
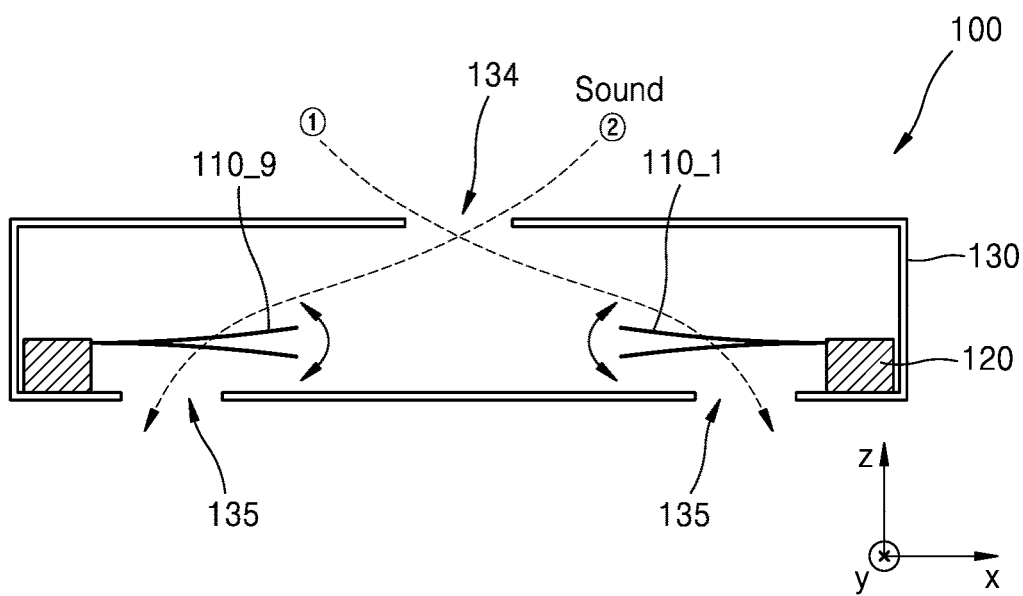
FIG. 2 is a cross-sectional view taken along line A-A' of the sound direction detection sensor of FIG. 1.

FIG. 1 is a plan view of a sound direction detection sensor 100 according to an embodiment. FIG. 2 is a cross-sectional view taken along line A-A' of the sound direction detection sensor 100 of FIG. 1. Referring to FIGS. 1 and 2, the sound direction detection sensor 100 according to an embodiment may include a sound inlet 134 receiving input sound, sound outlets 135 outputting the sound that is input through the sound inlet 134, and a plurality of directional vibrators 110_k arranged between the sound inlet 134 and the sound outlets 135. Herein, assuming that the number of directional vibrators 110_k is N, k is an integer between 1 and N.

A physical angular resolution of the sound direction detection sensor 100 may be determined based on the number N of directional vibrators 110_k. For example, the physical angular resolution of the sound direction detection sensor 100 may be expressed as 360°/N. The sound direction detection sensor 100 may detect an input direction of the sound by comparing magnitudes of outputs of the plurality of directional vibrators 110_k, and a higher angular resolution may be achieved when a larger number of directional vibrators 110_k, whose magnitudes of outputs are to be compared, are used.

The plurality of directional vibrators 110_k are arranged in such a manner that at least one directional vibrator 110_k selectively reacts based on a direction of the sound input through the sound inlet 134. The plurality of directional vibrators 110_k may be arranged to surround the sound inlet 134. The plurality of directional vibrators 110_k may be arranged on a plane not to overlap each other and all the plurality of directional vibrators 110_k may be exposed by the sound inlet 134. As illustrated in FIG. 1, the plurality of directional vibrators 110_k may be arranged on the same plane. In addition, the plurality of directional vibrators 110_k may be arranged to surround a center point C on the plane that is perpendicular to a central axis (e.g., in the direction of the Z-axis) of the sound inlet 134. The plurality of directional vibrators 110_k surround the center point C in a circular shape in FIG. 1, but the above description is merely an example. The plurality of directional vibrators 110_k are not limited to the above-described arrangement and may also be arranged in various shapes having symmetry with respect to the center point C. For example, the plurality of directional vibrators 110_k may be arranged in a polygonal or oval shape.

The number of sound outlets 135 may equal the number of directional vibrators 110_k and may respectively face the plurality of directional vibrators 110_k. The sound inlet 134 and the sound outlets 135 are not limited to any particular size or shape and may also have arbitrary sizes and shapes capable of equally exposing the plurality of directional vibrators 110_k.

For the sound inlet 134 and the sound outlets 135, a case 130 having openings corresponding to the shapes of the sound inlet 134 and the sound outlets 135 may be used. The case 130 may be made of various materials capable of blocking sound. For example, the case 130 may be made of a material such as aluminum. The sound inlet 134 and the sound outlets 135 provided in the case 130 are not limited to the shapes illustrated in FIG. 1.

Inside the case 130, a support 120 configured to support the plurality of directional vibrators 110_k and provide a space in which the plurality of directional vibrators 110_k vibrate in reaction to sound may be located. As illustrated in FIG. 1, the support 120 may be provided by forming a through hole TH in a substrate. The plurality of directional vibrators 110_k may be supported by the support 120 at ends thereof and be located to face the through hole TH. The through hole TH provides a space in which the directional vibrators 110_k vibrate due to an external force and is not limited to any particular shape or size as long as the through hole TH provides such a space. The support 120 may be made of various materials such as a silicon substrate.

Figure 3A:
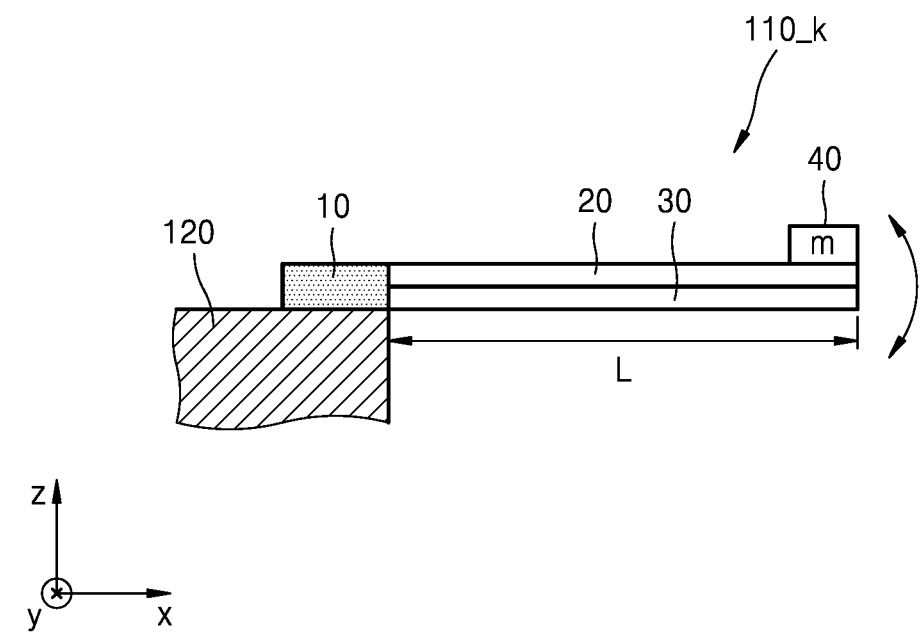
FIG. 3A is a cross-sectional view of one of a plurality of directional vibrators included in the sound direction detection sensor of FIG. 1.
Figure 3B:
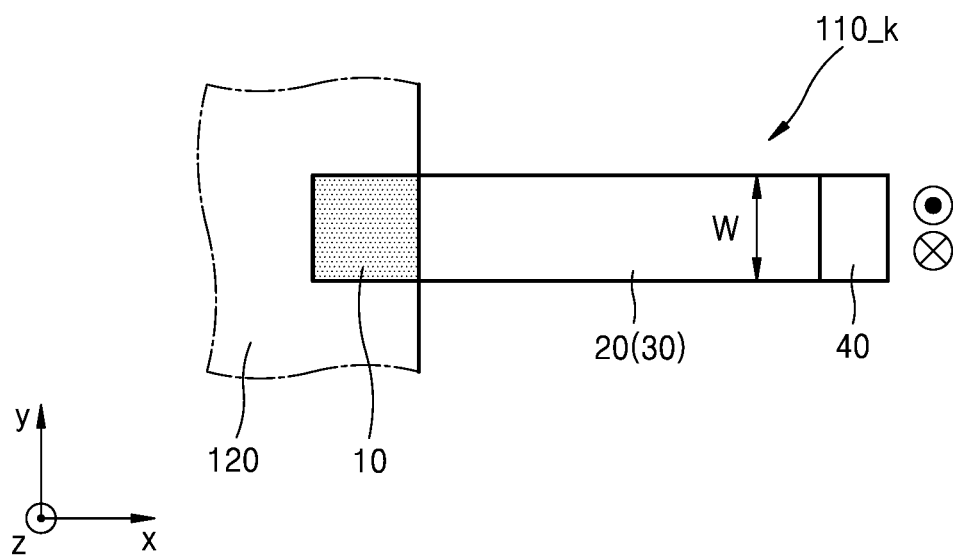
FIG. 3B is a plan view of one of the plurality of directional vibrators included in the sound direction detection sensor of FIG. 1.

FIG. 3A is a cross-sectional view of one of the plurality of directional vibrators 110_k included in the sound direction detection sensor 100 of FIG. 1, and FIG. 3B is a plan view of one of the plurality of directional vibrators 110_k included in the sound direction detection sensor 100 of FIG. 1. Referring to FIGS. 3A and 3B, the directional vibrator 110_k may include a fixed portion 10 fixed to the support 120, a movable portion 30 movable in reaction to a sound wave, and a sensing portion 20 configured to detect motion of the movable portion 30. The directional vibrator 110_k may further include a mass body 40 configured to provide a certain mass m to the movable portion 30.

The movable portion 30 may be made of, for example, an elastic film. The elastic film may have a length L and a width W and determine resonance characteristics of the directional vibrator 110_k together with the mass m of the mass body 40. The elastic film may be made of a material such as silicon, metal, or polymer.

The sensing portion 20 may include a sensor layer configured to detect motion of the movable portion 30. The sensing portion 20 may include, for example, a piezoelectric element. In this case, the sensing portion 20 may have a structure in which an electrode layer, a piezoelectric material layer, and another electrode layer are stacked on one another. The piezoelectric material may include, for example, zinc oxide (ZnO), tin oxide (SnO), lead zirconate titanate (PZT), zinc stannate (ZnSnO$_3$), polyvinylidene fluoride (PVDF), poly(vinylidene fluoride-trifluoroethylene) P(VDF-TrFE), aluminum nitride (AlN), or lead magnesium niobate-lead titanate (PMN-PT). The electrode layer may be made of a metal material or various other conductive materials.

Values of the width, thickness, etc. of the directional vibrators 110_k may be determined considering a resonant frequency desired for the directional vibrators 110_k. For example, each directional vibrator 110_k may have a width between about several micrometers to several hundred micrometers, a thickness less than or equal to several micrometers, and a length equal to or less than about several millimeters, but is not limited thereto. The micro-sized directional vibrators 110_k may be produced using a microelectromechanical system (MEMS) process.

The directional vibrator 110_k vertically vibrates in a Z-direction in reaction to an external signal and has an output proportional to a displacement z. The displacement z satisfies the following equation of motion.

$$m\frac{d^2z}{dt^2} + c\frac{dz}{dt} + kz = F_0\cos\omega t$$

In the above equation, c denotes a damping coefficient and k denotes an elastic coefficient. $F_0 \cos \omega t$ denotes a driving force and indicates an action by a signal input to the directional vibrator $110\_k$. The value of k is determined based on physical properties and the shape of the movable portion 30.

The directional vibrator $110\_k$ shows frequency response characteristics of a certain bandwidth with respect to a resonant frequency $f_0$ as a center frequency. The center frequency $f_0$ is defined below.

$$f_0 = \frac{1}{2\pi}\sqrt{\frac{k}{m}}$$

As such, the directional vibrators $110\_k$ included in the sound direction detection sensor 100 may detect sound having a certain frequency band with respect to a designed center frequency. Therefore, when the center frequency is designed, a frequency band having high availability in a given environment may be selected and the directional vibrators $110\_k$ may be implemented in accordance with the selected frequency band.

In the sound direction detection sensor 100 according to an embodiment, the directional vibrators $110\_k$ located in different positions may be set to the same length to have the same (i.e., uniform) resonant frequency. However, the plurality of directional vibrators $110\_k$ are not limited thereto and may be modified to have different (i.e., non-uniform) resonant frequencies.

Figure 4:
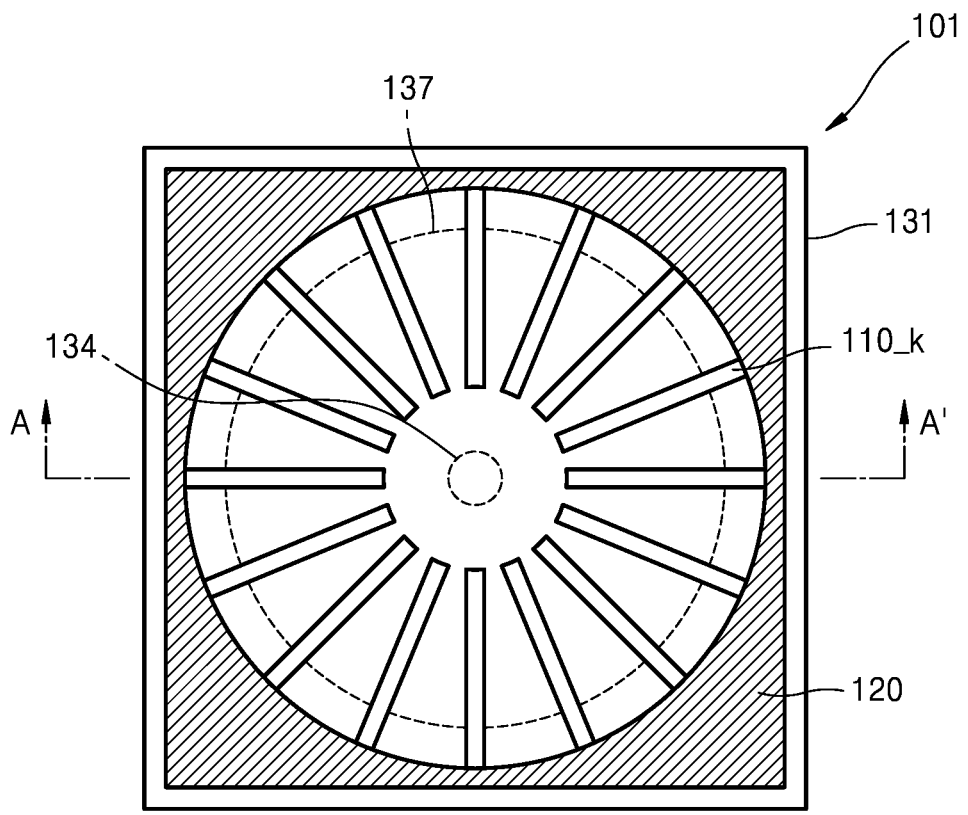
FIG. 4 is a plan view of a sound direction detection sensor according to another embodiment.
Figure 5:
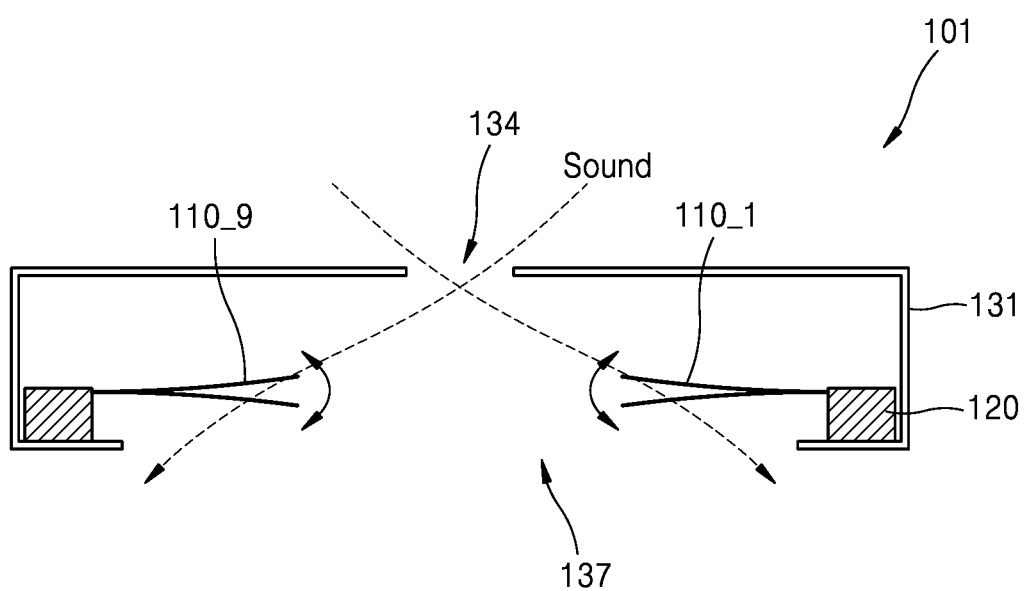
FIG. 5 is a cross-sectional view taken along line A-A' of the sound direction detection sensor of FIG. 4.

FIG. 4 is a plan view of a sound direction detection sensor 101 according to another embodiment. FIG. 5 is a cross-sectional view taken along line A-A' of the sound direction detection sensor 101 of FIG. 4. Referring to FIGS. 4 and 5, the sound direction detection sensor 101 may include the sound inlet 134 receiving input sound, a sound outlet 137 outputting the sound input through the sound inlet 134, and the plurality of directional vibrators $110\_k$ arranged between the sound inlet 134 and the sound outlet 137. Herein, assuming that the number of directional vibrators $110\_k$ is N, k is an integer from 1 to N.

Except for the shape of the sound outlet 137, the elements of the sound direction detection sensor 101 of FIGS. 4 and 5 are the same as those of the sound direction detection sensor 100 of FIGS. 1 and 2. For example, the sound outlet 137 is not provided in a plural number corresponding to the number of directional vibrators $110\_k$, and a single sound outlet 137 is shared by the plurality of directional vibrators $110\_k$. In other words, the single sound outlet 137 may face all the plurality of directional vibrators $110\_k$. The size of the sound outlet 137 illustrated in FIGS. 4 and 5 is an example and may be smaller than the illustrated size.

For the sound inlet 134 and the sound outlet 137, a case 131 having openings corresponding to the shapes of the sound inlet 134 and the sound outlet 137 may be used. The size of the sound outlet 137 may not be specified. For example, an entire space opposite to the sound inlet 134 with respect to the plurality of directional vibrators $110\_k$ may be open. The open space may serve as the sound outlet 137.

In the sound direction detection sensors 100 and 101 according to the embodiments described above, one or more of the plurality of directional vibrators $110\_k$, which are placed on input paths of directional sound, vibrate in reaction to the sound. For example, as illustrated in FIG. 2, when the sound is input along path ①, a first directional vibrator $110\_1$ located on this path and one or more directional vibrators adjacent thereto may vibrate. Otherwise, when the sound is input along path ②, a ninth directional vibrator $110\_9$ placed on this path and one or more directional vibrators adjacent thereto may vibrate. Therefore, an input direction of the sound may be detected considering outputs of the plurality of directional vibrators $110\_k$ based on the direction of the input sound.

Figure 6:
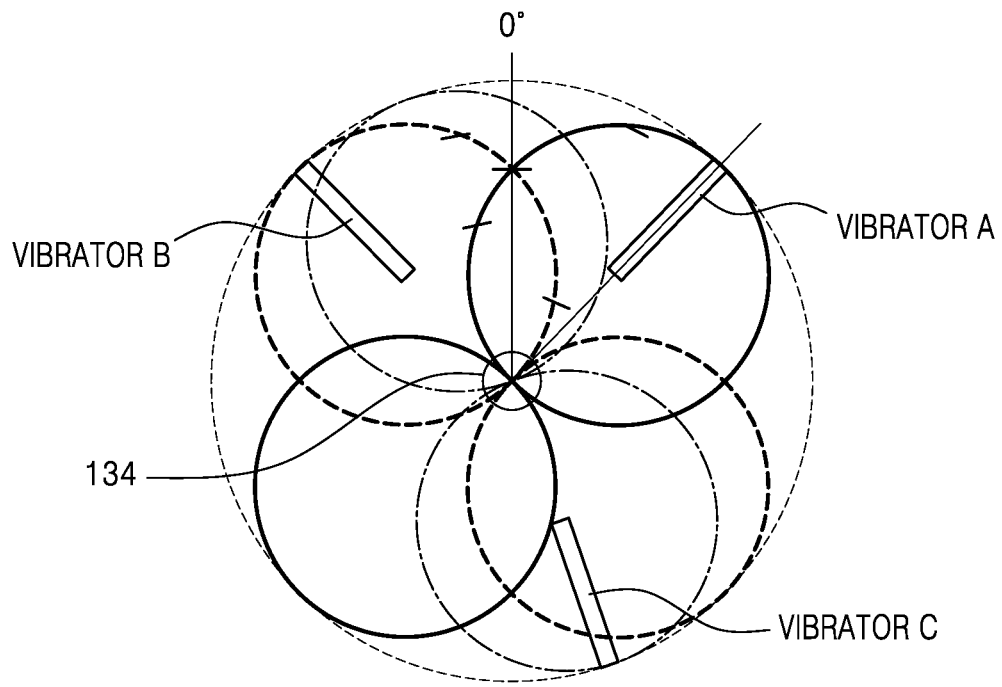
FIG. 6 is a plan view of some of a plurality of directional vibrators for describing an operation principle and directional gain characteristics of the plurality of directional vibrators.

FIG. 6 is a plan view of some of the plurality of directional vibrators $110\_k$ for describing an operation principle and directional gain characteristics of the plurality of directional vibrators $110\_k$. Referring to FIG. 6, a plurality of directional vibrators A, B, and C serve as unit acoustic sensors having directional angles corresponding to radial directions of a circle around the sound inlet 134. A directional gain curve of each unit acoustic sensor has a figure of eight. Due to the directional gain curves, the sound direction detection sensor 100 or 101 has an output in which outputs of the directional vibrators $110\_k$ selectively reacting to signals (e.g., sound waves) input from all directions are superposed.

Each directional vibrator $110\_k$ has a preferred angle, which is a principal direction, according to a position where the directional vibrator $110\_k$ is arranged. To the output, sound from a principal direction contributes a lot and sound from other directions contributes a little. Therefore, an input direction of sound from all arbitrary directions may be estimated by merely comparing magnitudes of outputs of the plurality of directional vibrators $110\_k$.

Figure 7:
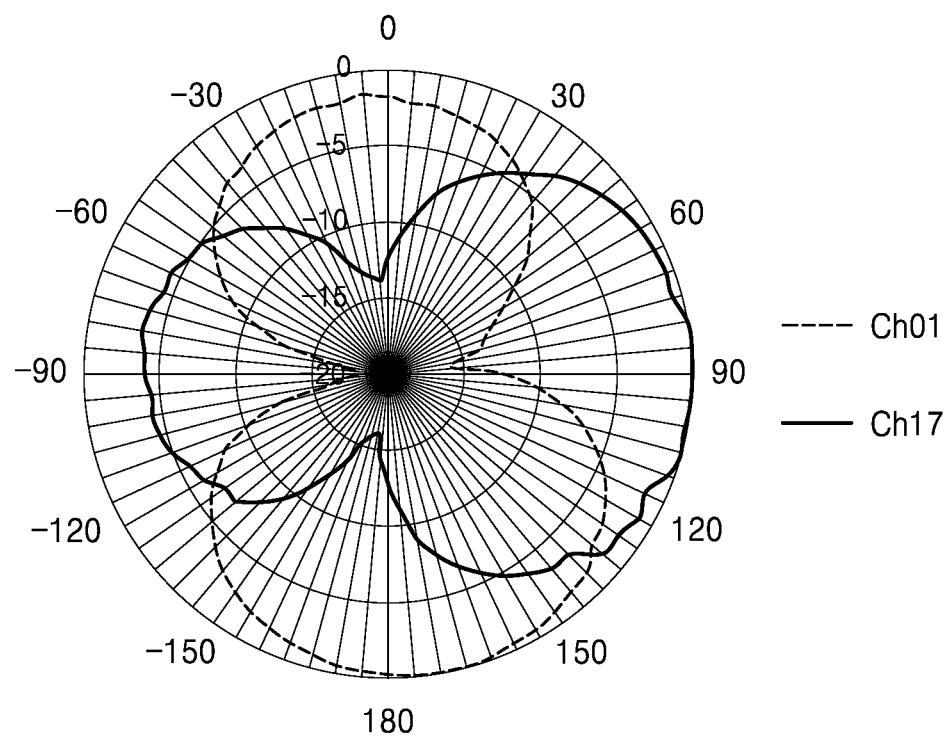
FIG. 7 is a graph showing an example of directional characteristics of two of the plurality of directional vibrators.

FIG. 7 is a graph showing an example of directional characteristics of two of the plurality of directional vibrators $110\_k$. In FIG. 7, it is assumed that sixty-four directional vibrators $110\_k$ are arranged on a single plane in a circular shape and are aligned toward a center point C on the plane that is perpendicular to a central axis of the sound inlet 134. Referring to FIG. 7, a first directional vibrator Ch01 located in a direction of 180° has the highest outputs in reaction to sound input from directions of 180° and 0° and has the lowest outputs in reaction to sound input from directions of −90° and +90°, thereby exhibiting figure-of-eight gain characteristics. In particular, the output generated in reaction to the sound input from the direction of 180° is slightly higher than the output generated in reaction to the sound input from the direction of 0°. A seventeenth directional vibrator Ch17 located in a direction of +90° (i.e., located at a position at a +90° offset) has the highest outputs in reaction to sound input from directions of +90° and −90° and has the lowest outputs in reaction to sound input from directions of 0° and 180°, thereby exhibiting figure-of-eight gain characteristics. In particular, the output generated in reaction to the sound input from the direction of +90° is slightly higher than the output generated in reaction to the sound input from the direction of −90°.

Figure 8:
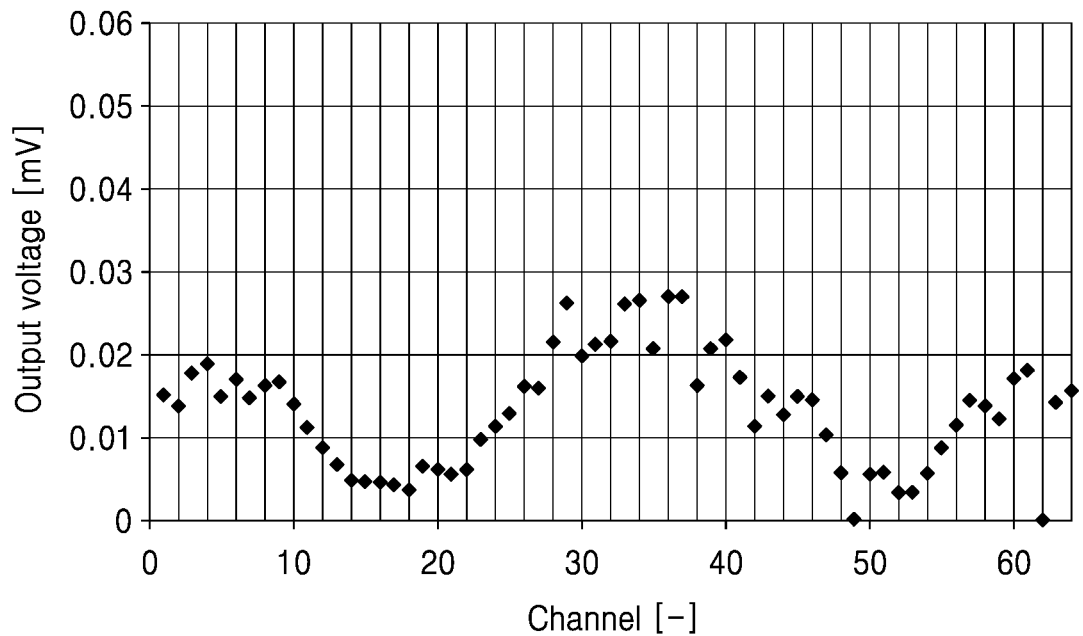
FIG. 8 is a graph showing outputs of all directional vibrators included in the sound direction detection sensor in a case when sound is input from one direction.

FIG. 8 is a graph showing outputs of all directional vibrators $110\_k$ included in the sound direction detection sensor 100 or 101 in a case when sound is input from one direction. In FIG. 8, it is assumed that sixty-four directional vibrators $110\_k$ are arranged and that sound is input toward a first directional vibrator in a length direction of the first directional vibrator. Referring to FIG. 8, the peak outputs are shown near the first directional vibrator and near a thirty-third directional vibrator located opposite to the first directional vibrator. In addition, the lowest outputs are shown near a seventeenth directional vibrator located in a direction of +90° (e.g., located at a position at a +90° offset) from the first directional vibrator and near a forty ninth directional vibrator located in a direction of −90° from the first directional vibrator. In particular, the output is the highest near the thirty-third directional vibrator.

Consequently, among the plurality of directional vibrators 110_k, a directional vibrator located in a direction of the input sound has the highest output and a directional vibrator located in a direction of ±90° from the direction of the input sound has the lowest output. Therefore, it is expected that an input direction of the sound may be detected using a directional vibrator having the highest output and a directional vibrator having the lowest output. However, depending on ambient noise and an intensity of the input sound, the direction of the input sound may differ from a direction of the directional vibrator having the highest output.

Figure 9A:
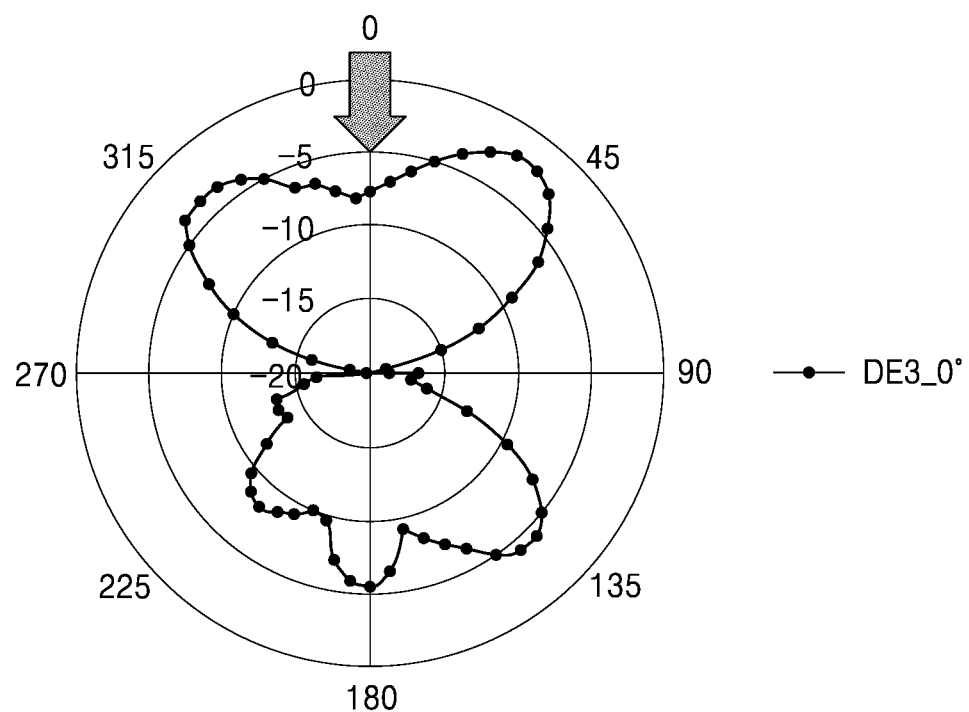
FIGS. 9A to 9D are graphs showing outputs of the plurality of directional vibrators based on an input direction of sound in various situations.
Figure 9B:
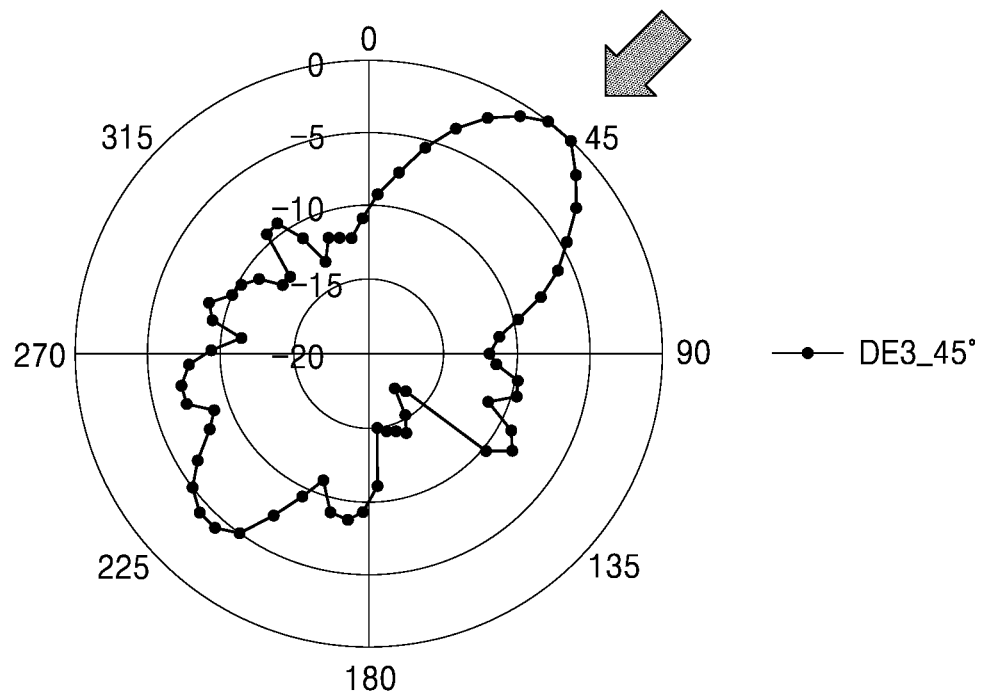
Figure 9C:
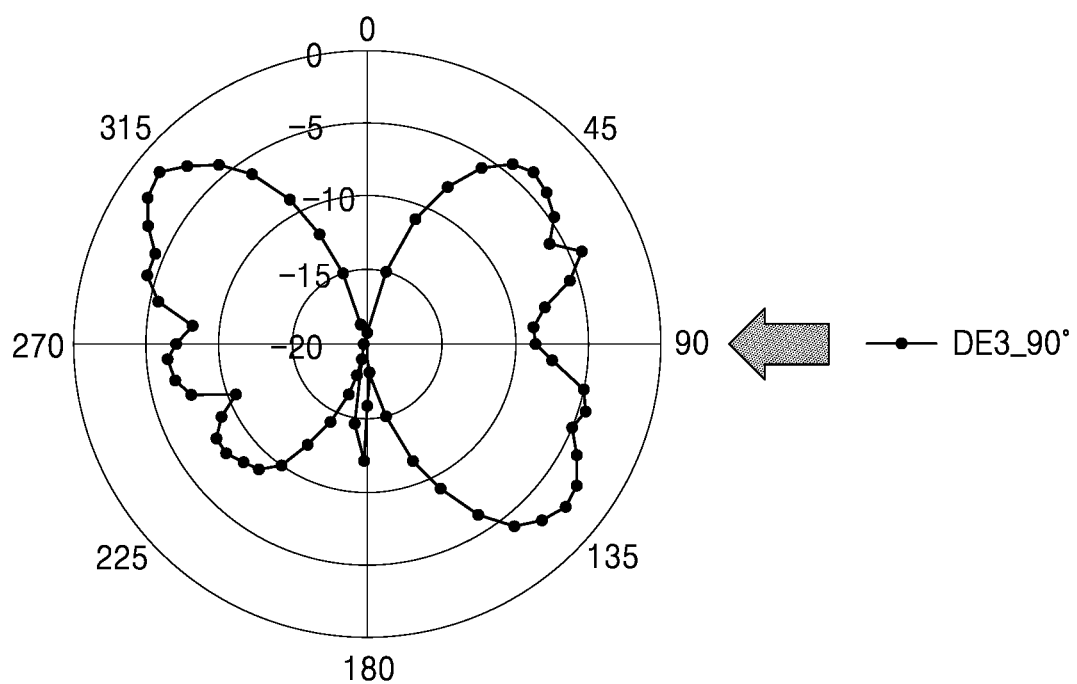
Figure 9D:
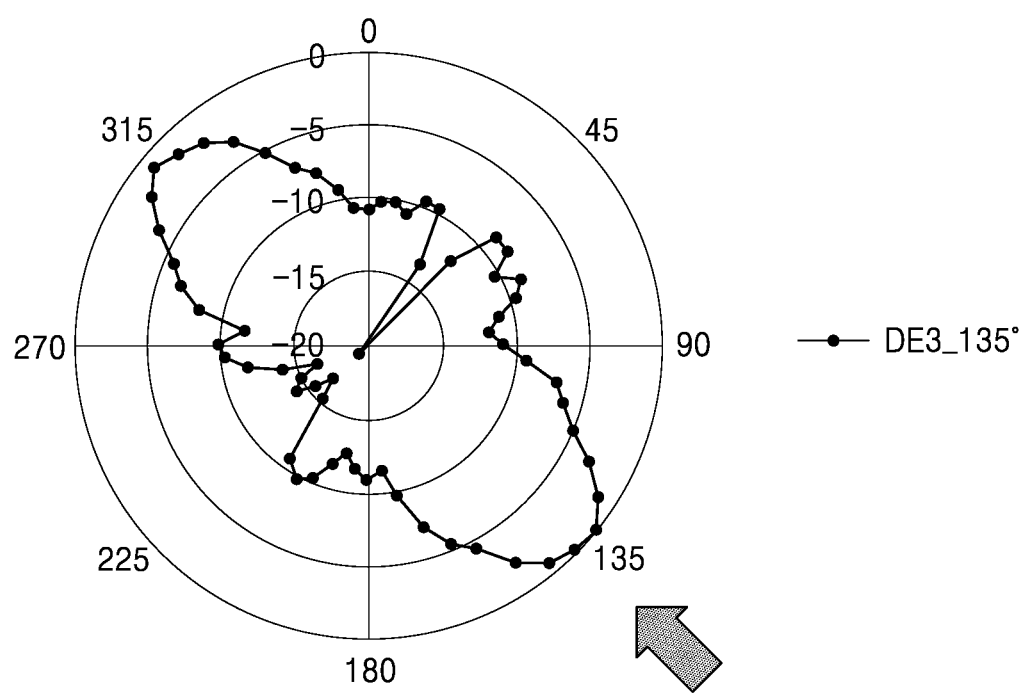

FIGS. 9A to 9D are graphs showing outputs of the plurality of directional vibrators 110_k based on a direction of input sound in various situations. In FIGS. 9A to 9D, an arrow indicates the direction of the input sound. FIGS. 9A and 9C show that the direction of the input sound differs from a direction of a directional vibrator having the highest output. Therefore, when direction information of the directional vibrator having the highest outputs is used, the accuracy of sound direction detection may be reduced.

On the contrary, referring to the graphs of FIGS. 7, 8, and 9A to 9D, it is shown that, regardless of an intensity of the input sound or ambient noise, a directional vibrator located in a direction of ±90° from the direction of the input sound always has the lowest output. Therefore, according to the current embodiment, a direction of the directional vibrator having the lowest output is specified by comparing outputs of the plurality of directional vibrators 110_k, and a direction of ±90° from the direction is determined as an input direction of the sound. Then, the input direction of the sound may be finally determined by comparing a magnitude of an output of the directional vibrator located in the direction of +90° to a magnitude of an output of the directional vibrator located in the direction of −90°.

Figure 10:
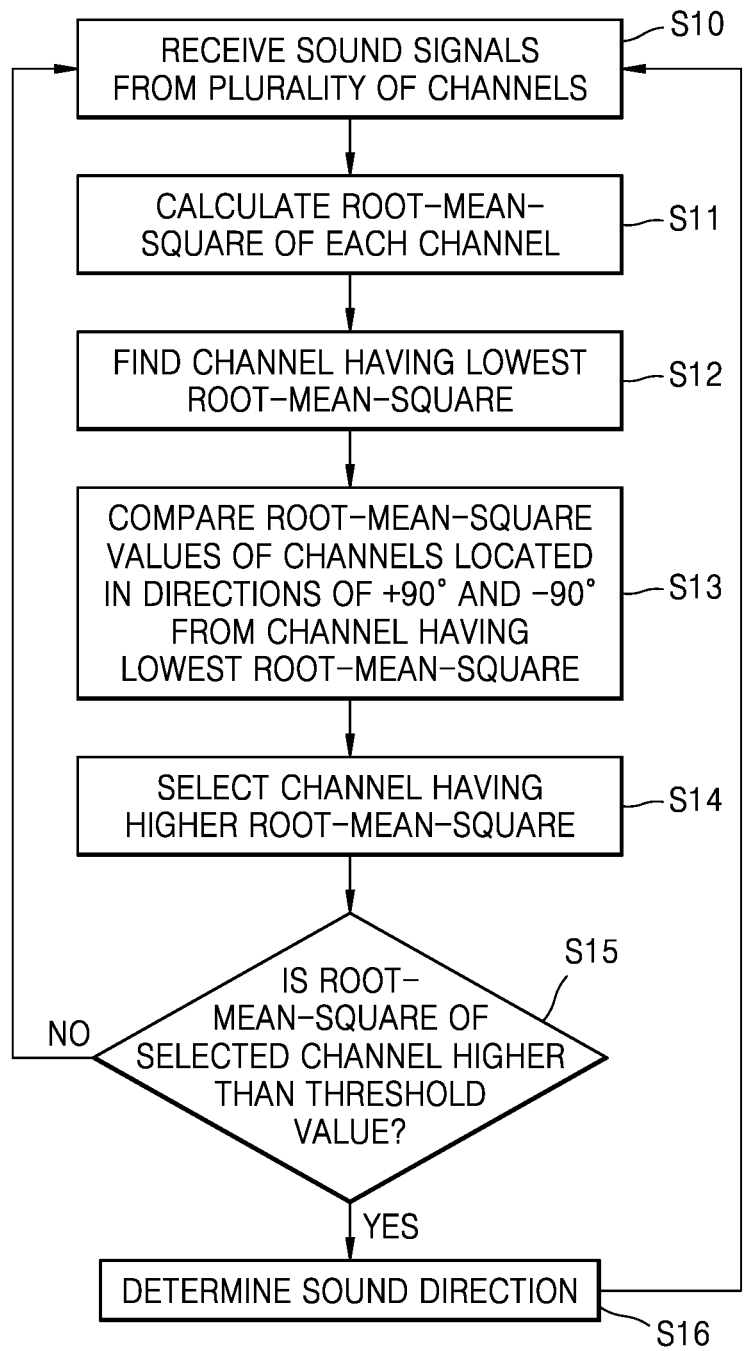
FIG. 10 is a flowchart of a sound direction detection method according to an embodiment.

FIG. 10 is a flowchart of a sound direction detection method according to an embodiment. The sound direction detection method according to the current embodiment will now be described in detail with reference to FIG. 10.

Initially, in operation S10, the sound direction detection sensor 100 or 101 receives a sound wave input to the sound direction detection sensor 100 or 101, by using the plurality of directional vibrators 110_k. For example, when sound is input to or detected at the sound inlet 134, the movable portions 30 of the plurality of directional vibrators 110_k vibrate at different amplitudes depending on an intensity and direction of the input sound. The sensing portions 20 generate voltages respectively corresponding to vibration waveforms of the movable portions 30.

The voltages generated by the sensing portions 20 are alternating voltages. Therefore, to calculate accurate outputs of the plurality of directional vibrators 110_k, in operation S11, root-mean-square (RMS) values of the alternating voltages generated by the plurality of directional vibrators 110_k in the time domain are calculated. Magnitudes of outputs of the plurality of directional vibrators 110_k, which are expressed as RMS values, are stored. To this end, the sound direction detection sensor 100 or 101 may further include a control circuit 140 (see FIG. 11) including a calculator 141 (see FIG. 11) configured to perform RMS calculation or value comparison, and a memory 142 (see FIG. 11) configured to store the magnitudes of the outputs of the plurality of directional vibrators 110_k.

Then, in operation S12, the calculator 141 (e.g., a processor) finds a directional vibrator having the lowest output in magnitude by comparing values of the magnitudes of the outputs of the plurality of directional vibrators 110_k, which are stored in the memory 142. For example, the values of the magnitudes of the outputs may be merely compared and a directional vibrator having the lowest value may be selected. Otherwise, when the magnitudes of the outputs of adjacent directional vibrators form a group of the lowest values within a preset deviation range, a directional vibrator located at the center of the directional vibrators forming the group of the lowest values may be selected. In another example, as illustrated in FIG. 8, a fact that a plurality of directional vibrators located at opposite sides form two groups of the lowest values may be considered. For example, in the two groups of the lowest values, every two directional vibrators located at an 180° angle from each other may be paired and a pair of directional vibrators having the smallest sum of magnitudes of outputs may be selected.

A direction perpendicular to a direction of the selected directional vibrator having the lowest output in magnitude may be determined as an input direction of the sound. For example, a direction of +90° or −90° from the direction of the directional vibrator having the lowest output in magnitude is the input direction of the sound. In operation S13, the calculator 141 compares an RMS of a directional vibrator located in the direction of +90° from the direction of the directional vibrator selected in operation S12, to an RMS of a directional vibrator located in the direction of −90° therefrom.

As described above, one of the directions of +90° and −90° from the direction of the directional vibrator having the lowest output in magnitude, which corresponds to a higher intensity of the sound, may be determined as the input direction of the sound. Therefore, in operation S14, the calculator 141 selects a directional vibrator determined as having a higher RMS in operation S13.

Then, in operation S15, the magnitude of the output, i.e., the RMS, of the finally selected directional vibrator is compared to a preset threshold value. When the magnitude of the output of the finally selected directional vibrator is lower than the threshold value, the control circuit 140 may classify the input sound as noise and the method may return to operation S10. However, when the magnitude of the output of the finally selected directional vibrator is greater than the threshold value, in operation S16, the control circuit 140 may regard the input sound as valid sound and determine a direction of the finally selected directional vibrator as the input direction of the sound. Information about the determined input direction of the sound may be used in various electronic apparatuses to be described below.

Figure 11:
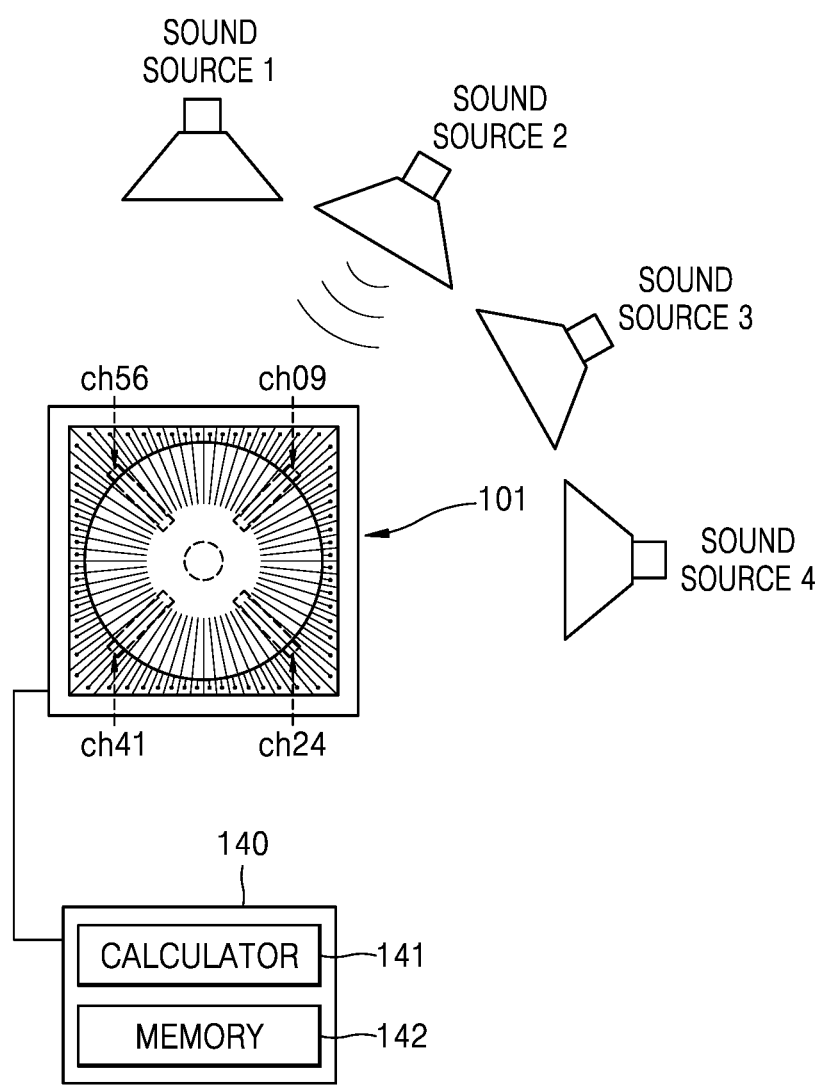
FIG. 11 is a schematic diagram showing a condition of an experiment of detecting an input direction of sound by using the sound direction detection sensor, according to an embodiment.

FIG. 11 is a schematic diagram showing a condition of an experiment of detecting an input direction of sound by using the sound direction detection sensor 101, according to an embodiment. Although the sound direction detection sensor 101 of FIGS. 4 and 5 is used in FIG. 11, the sound direction detection sensor 100 of FIGS. 1 and 2 may also be used. As illustrated in FIG. 11, the sound direction detection sensor 101 may include the control circuit 140 including the calculator 141 configured to perform RMS calculation or value comparison and the memory 142 configured to store magnitudes of outputs of the plurality of directional vibrators 110_k. The sound direction detection sensor 101 including sixty-four directional vibrators 110_k is used. Referring to FIG. 11, sound source 1, sound source 2, sound source 3, and sound source 4 are located in directions 0°, 30°, 60° and 90°, respectively, and sequentially output sound, and the control circuit 140 determines input directions of the sound by using the sound direction detection method described above in relation to FIG. 9.

Figure 12:
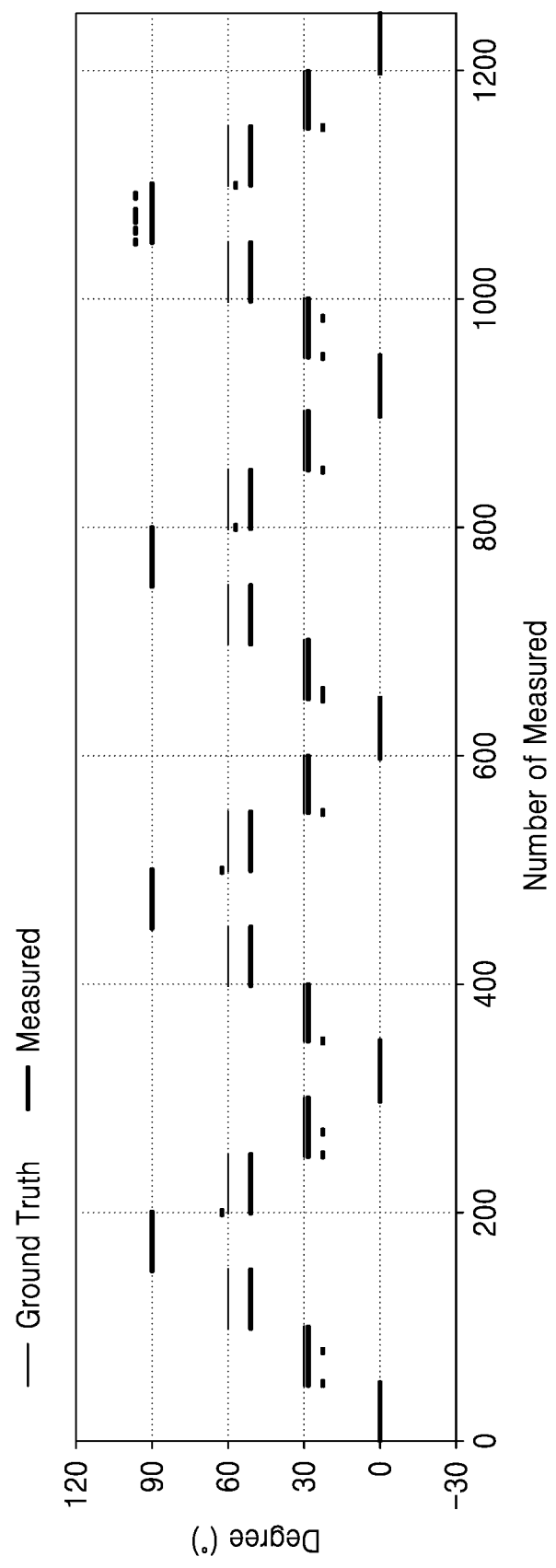
FIG. 12 is a graph showing a result of an experiment using single-tone sound sources.

FIG. 12 is a graph showing a result of an experiment using single-tone sound sources. For example, sound source 1, sound source 2, sound source 3, and sound source 4 sequentially output sound of the same tone, e.g., 500 Hz, for a certain time, and the control circuit 140 detects an input direction of the sound whenever the sound is detected. Referring to FIG. 12, it is shown that input directions of the single-tone sound are very accurately detected. For example, a standard deviation using the single-tone sound is about 0.8°.

Figure 13:
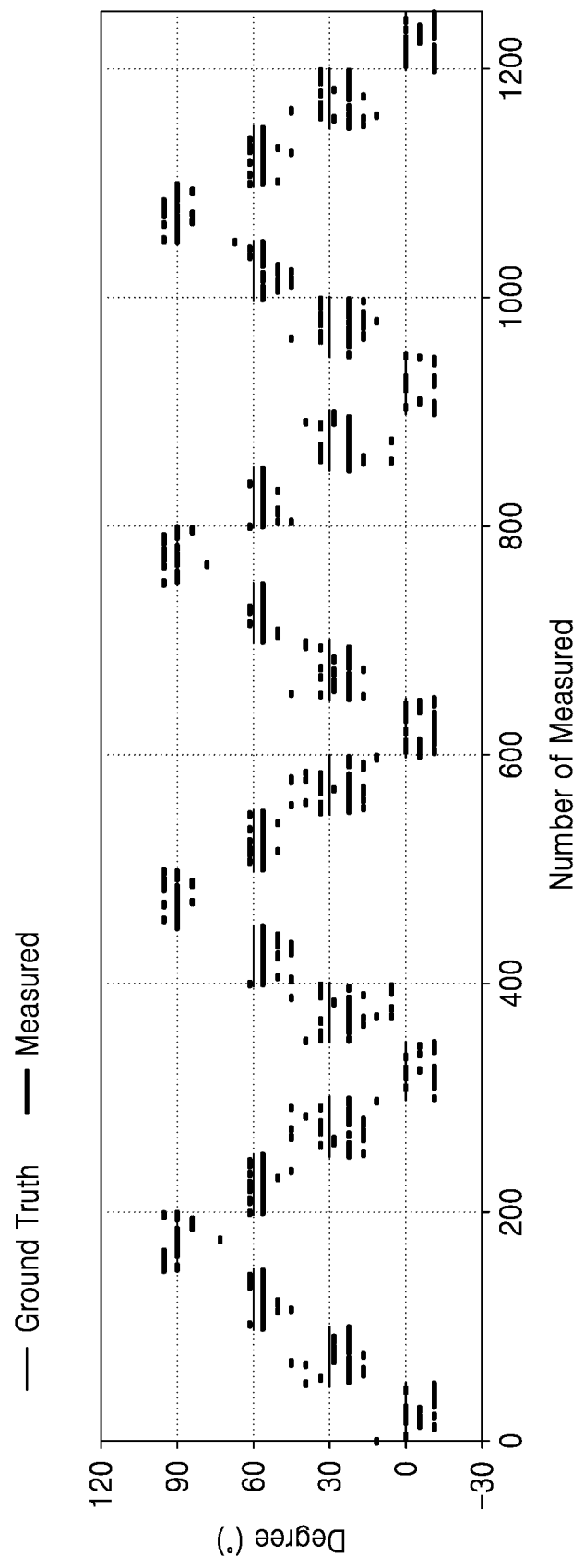
FIG. 13 is a graph showing a result of an experiment using music sound sources.

FIG. 13 is a graph showing a result of an experiment using music sound sources. For example, sound source 1, sound source 2, sound source 3, and sound source 4 sequentially output music sound for a certain time. Referring to FIG. 13, it is shown that input directions of the music sound source are relatively accurately detected. For example, a standard deviation using the music sound is about 4.9°.

Therefore, a high angular resolution within about 6° may be achieved using the small compass-type sound direction detection sensor 100 or 101 having sixty-four directional vibrators 110_k. Furthermore, a higher angular resolution may be achieved by increasing the number of directional vibrators 110_k, and a desired angular resolution may be achieved based on the number of directional vibrators 110_k. The sound direction detection sensor 100 or 101 may have a small size and thus may be easily used in compact electronic products. In addition, since the sound direction detection sensor 100 or 101 detects an input direction of sound by using a directional vibrator that most weakly vibrates among the plurality of directional vibrators 110_k, an intensity of the input sound and ambient noise may not exert a strong influence on the sound direction detection sensor 100 or 101.

Figure 14:
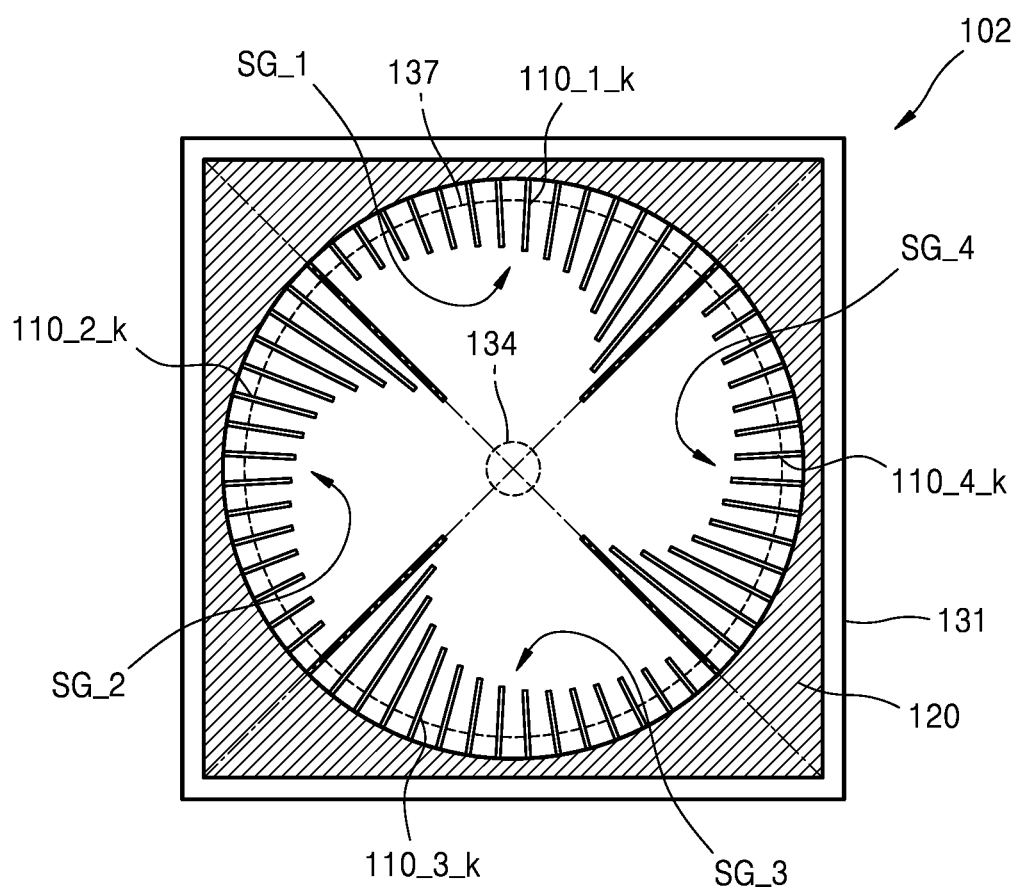
FIG. 14 is a plan view of a sound direction detection sensor according to another embodiment.

When music sound sources are used, the angular resolution may be increased using a combination of directional vibrators 110_k having various resonant frequencies. For example, FIG. 14 is a plan view of a sound direction detection sensor 102 according to another embodiment. The sound direction detection sensor 102 includes first to fourth subgroups SG_1, SG_2, SG_3, and SG_4. Each of the first to fourth subgroups SG_1, SG_2, SG_3, and SG_4 may include a group of a certain number of adjacent directional vibrators to represent a different direction. For example, the first to fourth subgroups SG_1, SG_2, SG_3, and SG_4 may represent four quadrants of equal sizes and directions at increments of 90°.

The sound direction detection sensor 102 according to the current embodiment differs from the embodiments described above in that the sound direction detection sensor 102 includes directional vibrators 110_1_k, 110_2_k, 110_3_k, and 110_4_k having different resonant frequencies. For example, the first to fourth subgroups SG_1, SG_2, SG_3, and SG_4 may include the directional vibrators 110_1_k, 110_2_k, 110_3_k, and 110_4_k which vary in length to have a certain frequency range, respectively. The sound direction detection sensor 102 configured as described above has four physical directions instead of sixty-four directions, but a frequency band in the first to fourth subgroups SG_1, SG_2, SG_3, and SG_4 may be broadened to an entire audible band instead of a single resonance band.

The first subgroup SG_1 includes a plurality of directional vibrators 110_1_k arranged along a circumference of a central angle range of 90°, the second subgroup SG_2 includes a plurality of directional vibrators 110_2_k arranged along a circumference of a next central angle range of 90°, the third subgroup SG_3 includes a plurality of directional vibrators 110_3_k arranged along a circumference of a next central angle range of 90°, and the fourth subgroup SG_4 includes a plurality of directional vibrators 110_4_k arranged along a circumference of a next central angle range of 90°.

Resonant frequencies of directional vibrators 110_i_k included in an i-th subgroup SG_i (where i is an integer between 1 and 4 and k is an integer between 1 and N) are set to detect sound of a certain frequency range Δt A resonant frequency interval between adjacent directional vibrators 110_i_k may be determined considering the number N of and the frequency range Δf of the directional vibrators 110_i_k included in the subgroup SG_i.

The plurality of directional vibrators 110_i_k included in each subgroup SG_i may be arranged in the order of the resonant frequencies. The arrangement in the order of the resonant frequencies may be equally applied to a plurality of subgroups SG_i. For example, as illustrated in FIG. 14, the directional vibrators 110_i_k of each subgroup SG_i may be arranged in such a manner that lengths thereof gradually increase in a clockwise direction. However, the directional vibrators 110_i_k are not limited thereto and may also be arranged in such a manner that lengths thereof gradually increase in a counterclockwise direction. Alternatively, directional vibrators of some subgroups SG_i may be arranged in such a manner that lengths thereof gradually increase in a clockwise direction and directional vibrators of the other subgroups SG_j (where j≠i) may be arranged in such a manner that lengths thereof gradually increase in a counterclockwise direction.

In the above-described sound direction detection sensor 102 including a plurality of directional vibrators having different resonant frequencies, the directional vibrators are not limited to the above-described arrangements. The directional vibrators of each subgroup may be arranged at different intervals, e.g., at different frequency or space intervals, and may be arranged in various manners considering, for example, coupling between adjacent directional vibrators.

Figure 15:
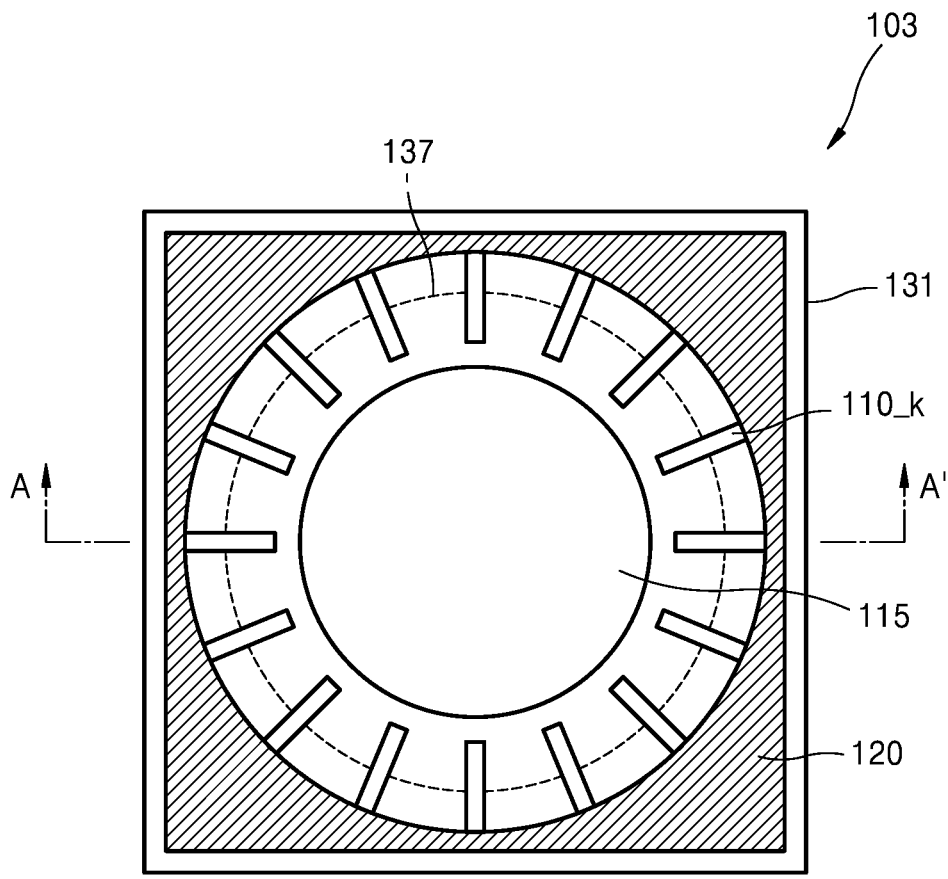
FIG. 15 is a plan view of a sound direction detection sensor according to another embodiment.
Figure 16:
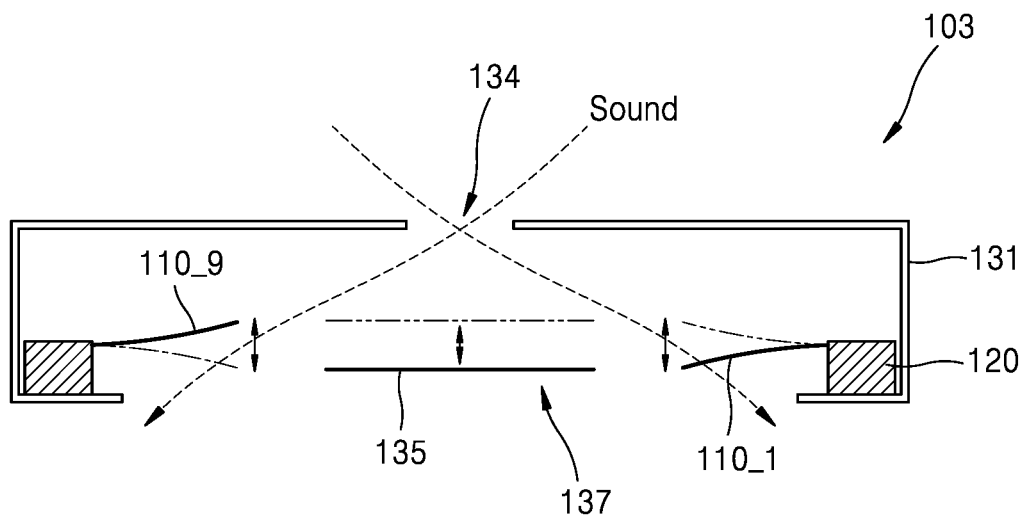
FIG. 16 is a cross-sectional view taken along line A-A' of the sound direction detection sensor of FIG. 15.

FIG. 15 is a plan view of a sound direction detection sensor 103 according to another embodiment, and FIG. 16 is a cross-sectional view taken along line A-A' of the sound direction detection sensor 103 of FIG. 15. Referring to FIGS. 15 and 16, the sound direction detection sensor 103 may further include an omnidirectional vibrator 115 reacting to input sound regardless of a direction thereof. The other elements of the sound direction detection sensor 103 of FIGS. 15 and 16 may be the same as those of the sound direction detection sensor 101 of FIGS. 4 and 5.

The omnidirectional vibrator 115 may be located, for example, in the sound outlet 137 and may be located on the same plane as the plurality of directional vibrators 110_k. In this case, the plurality of directional vibrators 110_k may be arranged to surround the omnidirectional vibrator 115. However, the omnidirectional vibrator 115 is not limited to the above-described location and may also have various other locations. For example, the omnidirectional vibrator 115 may be located outside the case 131.

Unlike the directional vibrators 110_k, the omnidirectional vibrator 115 may have almost the same output in reaction to sound input from all directions. To this end, the omnidirectional vibrator 115 may have a form of a circular thin film. When the omnidirectional vibrator 115 is located in the sound outlet 137, the omnidirectional vibrator 115 may be located in such a manner that the center of the circular omnidirectional vibrator 115 is aligned with a center point of the sound outlet 137.

Although the output of the omnidirectional vibrator 115 is constant regardless of the direction of the input sound, a phase of vibration of the omnidirectional vibrator 115 may vary depending on the direction of the input sound. For example, as schematically illustrated in FIG. 16, the phase of vibration of the omnidirectional vibrator 115 may be the same as a phase of vibration of the directional vibrator 110_1 that is located in the direction of the input sound among the directional vibrators 110_k. In addition, the phase of vibration of the omnidirectional vibrator 115 may be opposite to a phase of vibration of the directional vibrator 110_9 located in a direction opposite to the direction of the input sound among the directional vibrators 110_k.

Figure 17:
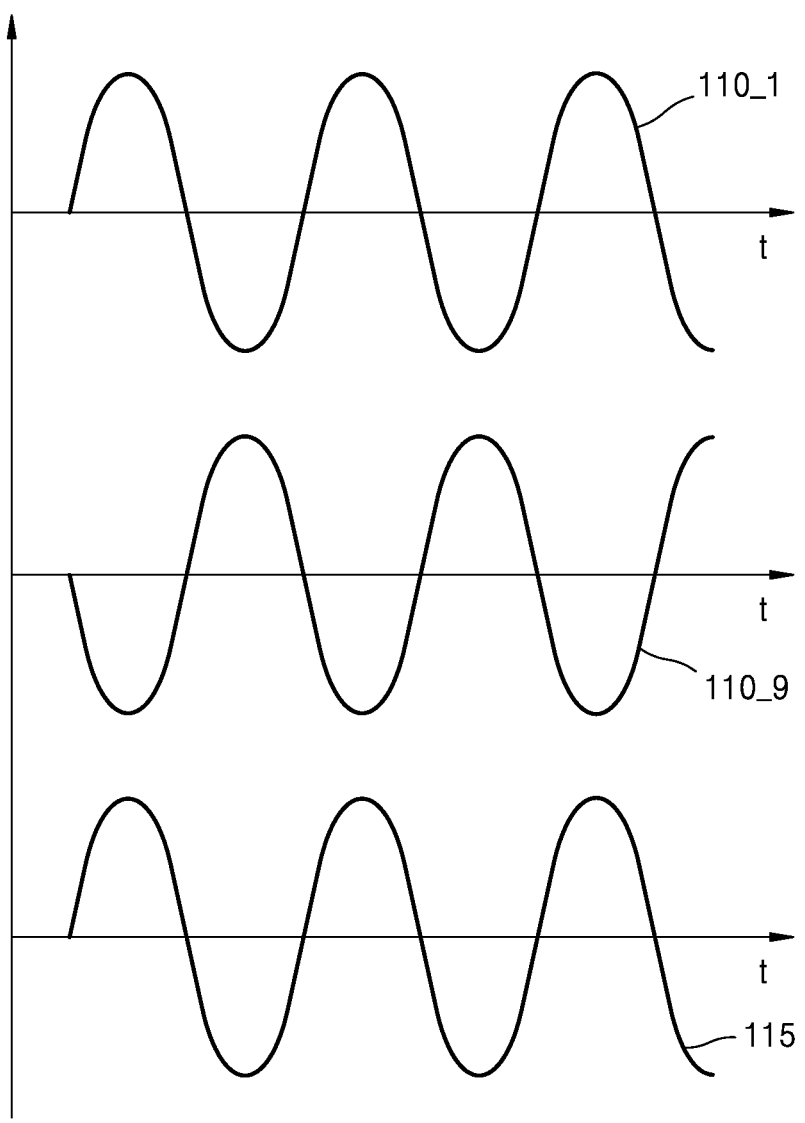
FIG. 17 is a graph showing an example of phases of vibration of one omnidirectional vibrator and two directional vibrators facing each other in a case when sound is input from one direction.

FIG. 17 is a graph showing an example of phases of vibration of the omnidirectional vibrator 115 and the two directional vibrators 110_1 and 110_9 facing each other in a case when sound is input from one direction. For example, it is assumed that the directional vibrators 110_1 and 110_9 are located to face each other and that sound is input in a direction from the directional vibrator 110_1 toward the directional vibrator 110_9. As illustrated in FIG. 17, the phase of vibration of the directional vibrator 110_1 is 180° opposite to the phase of vibration of the directional vibrator 110_9. The phase of vibration of the omnidirectional vibrator 115 is the same as the phase of vibration of the directional vibrator 110_1 and is 180° opposite to the phase of vibration of the directional vibrator 110_9.

Therefore, an input direction of the sound may be detected with reference to phases of vibration of the omnidirectional vibrator 115 and the directional vibrators 110_k. For example, FIG. 18 is a flowchart of a sound direction detection method according to another embodiment.

Figure 18:
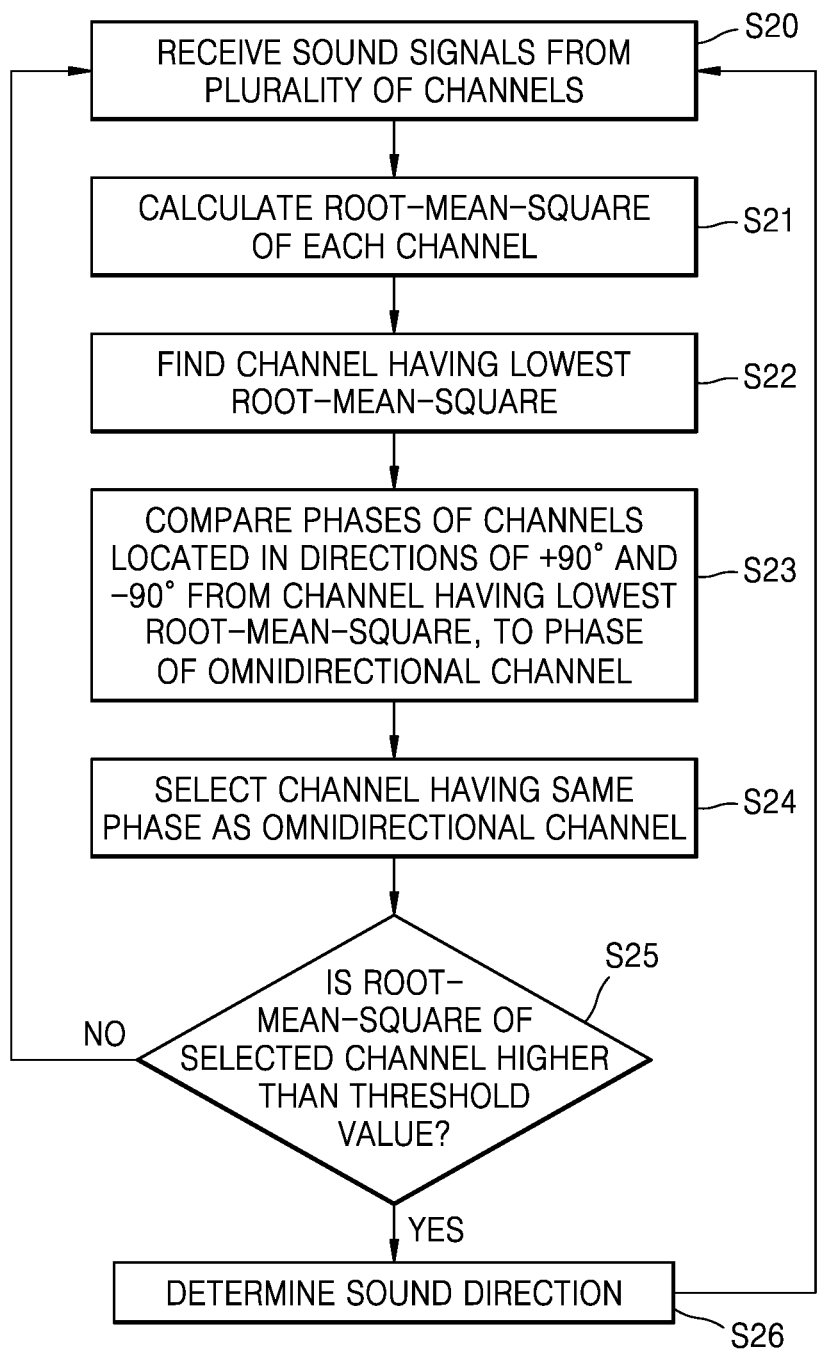
FIG. 18 is a flowchart of a sound direction detection method according to another embodiment.

Initially, operations S20 to S22 of FIG. 18 are the same as operations S10 to S12 described above in relation to FIG. 10. Therefore, descriptions of operations S20 to S22 will be briefly provided. In operation S20, the sound direction detection sensor 103 receives a sound wave input to the sound direction detection sensor 103, by using the plurality of directional vibrators 110_k. In operation S21, RMS values of alternating voltages generated by the plurality of directional vibrators 110_k in the time domain are calculated. Magnitudes of outputs of the plurality of directional vibrators 110_k, which are expressed as RMS values, are stored in the memory 142. In operation S22, the calculator 141 finds a directional vibrator having the lowest output in magnitude by comparing values of the magnitudes of the outputs of the plurality of directional vibrators 110_k, which are stored in the memory 142.

A direction perpendicular to a direction of the selected directional vibrator having the lowest output in magnitude may be determined as an input direction of the sound. For example, a direction of +90° or −90° from the direction of the directional vibrator having the lowest output in magnitude is the input direction of the sound. In operation S23, the calculator 141 compares phases of vibration of directional vibrators located in directions of +90° and −90° from the direction of the directional vibrator selected in operation S22, to a phase of vibration of the omnidirectional vibrator 115. For example, vibration waveforms of the directional vibrators located in directions of +90° and −90° may be summed with a vibration waveform of the omnidirectional vibrator 115. In this case, a directional vibrator corresponding to a resultant waveform that increases due to constructive interference may be determined as having the same phase of vibration as the omnidirectional vibrator 115, and a directional vibrator corresponding to a resultant waveform that decreases due to destructive interference may be determined as having a phase of vibration opposite to the phase of vibration of the omnidirectional vibrator 115. The phases of vibration may also be compared in various other methods.

As described above, a direction of a directional vibrator having the same phase of vibration as the omnidirectional vibrator 115 among the directional vibrators located in directions of +90° and −90° from the direction of the directional vibrator having the lowest output in magnitude may be determined as the input direction of the sound. Therefore, in operation S24, the calculator 141 may select a directional vibrator having the same phase of vibration as the omnidirectional vibrator 115. Alternatively, the calculator 141 may select a directional vibrator having a phase of vibration closer to the phase of vibration of the omnidirectional vibrator 115.

Then, in operation S25, the RMS of the finally selected directional vibrator is compared to a preset threshold value. When the magnitude of the output of the finally selected directional vibrator is lower than the threshold value, the control circuit 140 may classify the input sound as noise and the method may return to operation S20. However, when the magnitude of the output of the finally selected directional vibrator is greater than the threshold value, in operation S26, the control circuit 140 may regard the input sound as valid sound and determine a direction of the finally selected directional vibrator as the input direction of the sound.

As described above, the greatest magnitudes of outputs of the directional vibrator 110_k may vary depending on various situations, e.g., ambient noise. When the method described above in relation to FIG. 10 is used, in some cases, the input direction of the sound may be determined as a direction 180° opposite to the input direction. On the contrary, using the phases of vibration, the input direction of the sound may be accurately determined in a noisy environment.

The sound direction detection sensors 100, 101, 102, and 103 according to the embodiments described above may be used in various electronic apparatuses. For example, the sound direction detection sensors 100, 101, 102, and 103 may be implemented as chip-solution sensors and may perform sound source tracking, noise cancellation, and spatial recording in the field of mobile devices, information technology (IT), home appliances, and vehicles or may be used in the field of panoramic photographing, augmented reality, and virtual reality.

Electronic apparatuses using the above-described sound direction detection sensors 100, 101, 102, and 103 will now be described.

Figure 19:
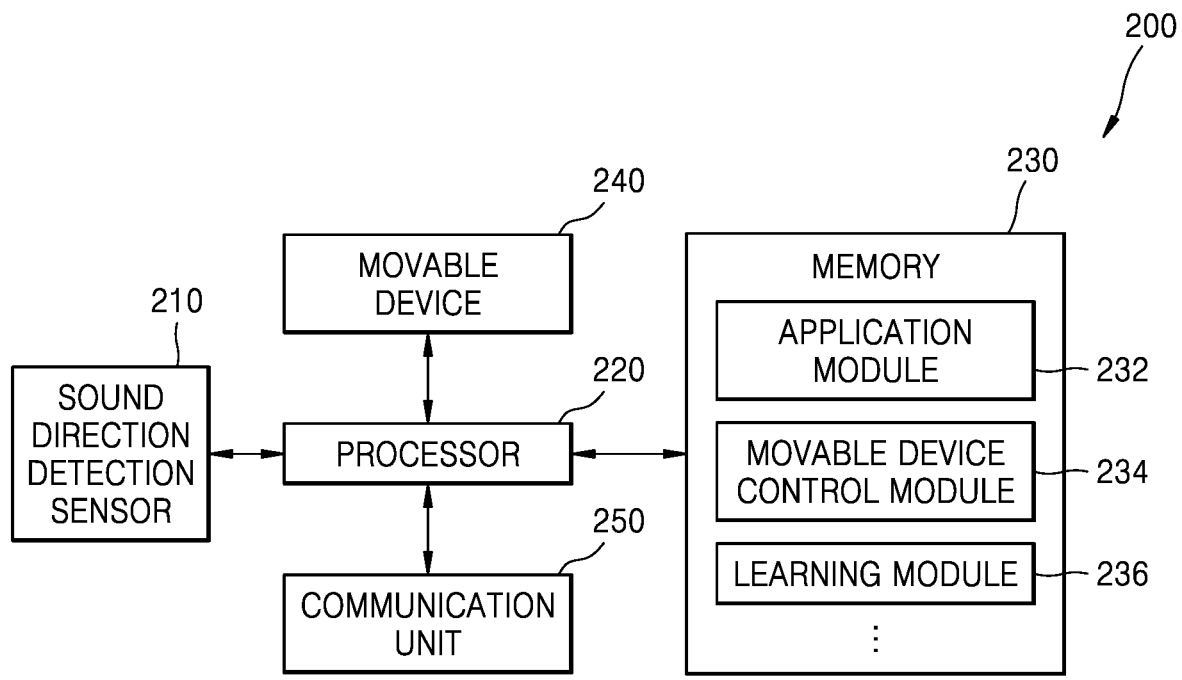
FIG. 19 is a block diagram of an Internet of things (IoT) apparatus according to an embodiment.
Figure 20:
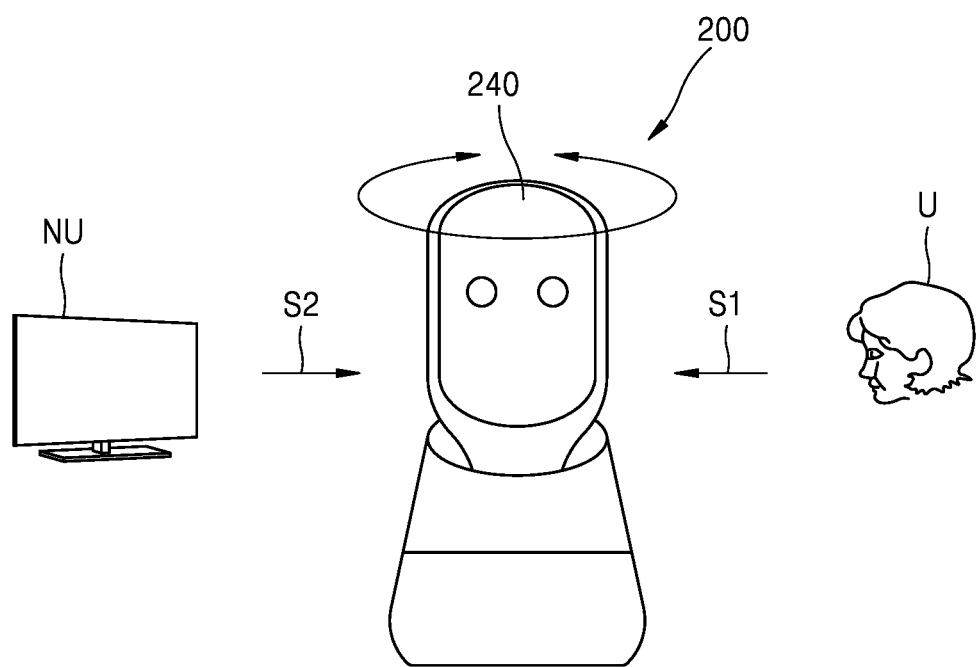
FIG. 20 is a schematic diagram for describing an example of operation of the IoT apparatus of FIG. 19 in daily life.

FIG. 19 is a block diagram of an Internet of things (IoT) apparatus 200 according to an embodiment, and FIG. 20 is a schematic diagram for describing an example of operation of the IoT apparatus 200 of FIG. 19 in daily life.

The IoT apparatus 200 may include a sound direction detection sensor 210 configured to receive a voice signal provided by a user, a memory 230 configured to store one or more application modules 232 using signals received by the sound direction detection sensor 210, as input variables, and a processor 220 configured to execute the application modules 232. The IoT apparatus 200 may further include a communication unit 250.

The IoT apparatus 200 may further include a movable device 240 capable of rotating or moving. The movable device 240 may be controlled to rotate or move in a direction determined based on an execution result of any application module 232 by using the signal received by the sound direction detection sensor 210, as an input variable. The direction of rotation or motion may be, for example, a direction facing or avoiding a direction of sound detected by the sound direction detection sensor 210. The movable device 240 may be implemented to have an output function capable of outputting the execution result of the application module 232 to the user. The movable device 240 may be an output device, e.g., a speaker or a display. The sound direction detection sensor 210 may include any one of, a modification of, or a combination of the sound direction detection sensors 100, 101, 102, and 103 according to the embodiments described above.

The processor 220 may control overall operations of the IoT apparatus 200. The processor 220 may control operations of the sound direction detection sensor 210, the movable device 240, and the communication unit 250, use related control signals, and execute programs stored in the memory 230. The memory 230 may include a movable device control module 234 programmed to rotate or move the movable device 240 in a certain direction based on a control signal. The movable device control module 234 may control the movable device 240 to rotate or move in a direction facing or avoiding the direction of sound detected by the sound direction detection sensor 210, by using a signal detected by the sound direction detection sensor 210 and an execution result of an application associated with the signal. However, the above description is merely an example and the direction of rotation or motion of the movable device 240 based on the signal detected by the sound direction detection sensor 210 and the execution result of the application may be variously changed.

The memory 230 may further include a learning module 236 programmed to learn whether the signal received by the sound direction detection sensor 210 is a valid input signal, in association with the direction of sound. For example, the learning module 236 may repeatedly generate and accumulate, as learning data, the direction of sound detected by the sound direction detection sensor 210 and a result of determining whether the signal is a valid signal, and extract statistic features from the accumulated learning data, thereby treating sound input from a certain direction, as an invalid signal. As described herein, valid signal may mean any signal that satisfies criteria determined by the manufacturer of the sound direction detection sensor 210. For example, only human voices may qualify as valid signals while ambient noise may be considered an invalid signal. Other criteria (e.g., based on desired characteristics regarding the signal's frequency, amplitude, etc.). The memory 230 may also store various other programs and data required for the processor 220 to control overall operations of the IoT apparatus 200.

The memory 230 may include at least one type of storage medium among, for example, flash memory, a hard disk, a multimedia card micro, a memory card (e.g., secure digital (SD) or extreme digital (XD) memory), random access memory (RAM), static random access memory (SRAM), read-only memory (ROM), electrically erasable programmable ROM (EEPROM), programmable ROM (PROM), magnetic memory, a magnetic disc, and an optical disc.

The communication unit 250 may communicate with an external device by using, but not limited to, Bluetooth communication, Bluetooth low energy (BLE) communication, near-field communication (NFC), wireless local area network (WLAN) communication, Zigbee communication, Infrared Data Association (IrDA) communication, WiFi direct (WFD), ultra-wideband (UWB) communication, Ant+ communication, WiFi communication, or the like.

Referring to FIG. 20, the movable device 240 included in the IoT apparatus 200 is illustrated as a rotatable speaker. A speaker will be described below as an example of the movable device 240, but the movable device 240 is not limited thereto. The IoT apparatus 200 may determine a direction of an input sound wave S1 or S2 and rotate the speaker to face the determined direction.

The IoT apparatus 200 may identify a valid signal (i.e., a valid sound wave) among the input sound waves S1 and S2. For example, the IoT apparatus 200 may distinguish between the sound wave S1 from a user U and the sound signal S2 from a sound source NU that is not a user (e.g., a television). The IoT apparatus 200 may distinguish between the sound waves S1 and S1 by learning whether an input signal is a valid signal, in association with a direction of input sound. As such, for example, after learning and determining that an invalid signal is continuously input from a certain fixed direction, e.g., a television (TV), the IoT apparatus 200 may rotate the speaker toward the direction of the sound waves S2 that is determined as a valid signal among the input sound waves S1 and S2, and execute an application related to the sound wave S2. The IoT apparatus 200 may be used as an artificial intelligence (AI) speaker and may also be applied to various other objects to enhance utilization of inherent functions of the objects.

Figure 21:
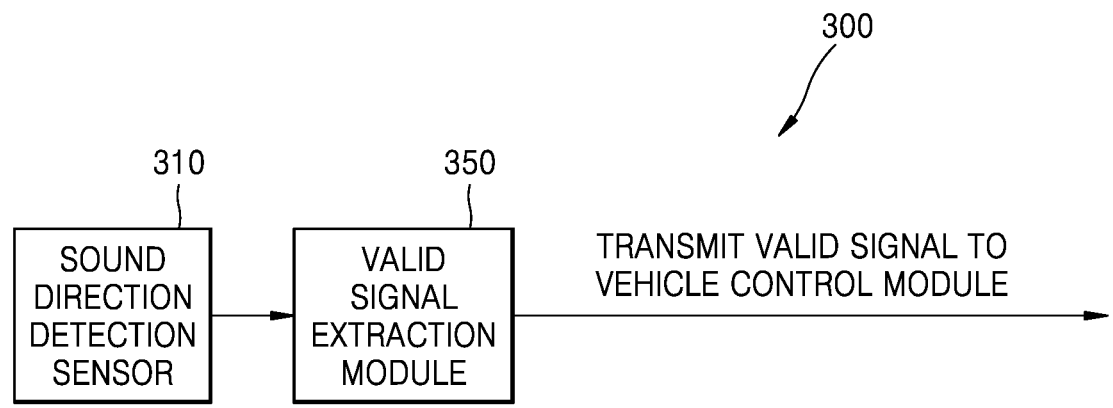
FIG. 21 is a block diagram of a vehicle voice interface apparatus according to an embodiment.
Figure 22:
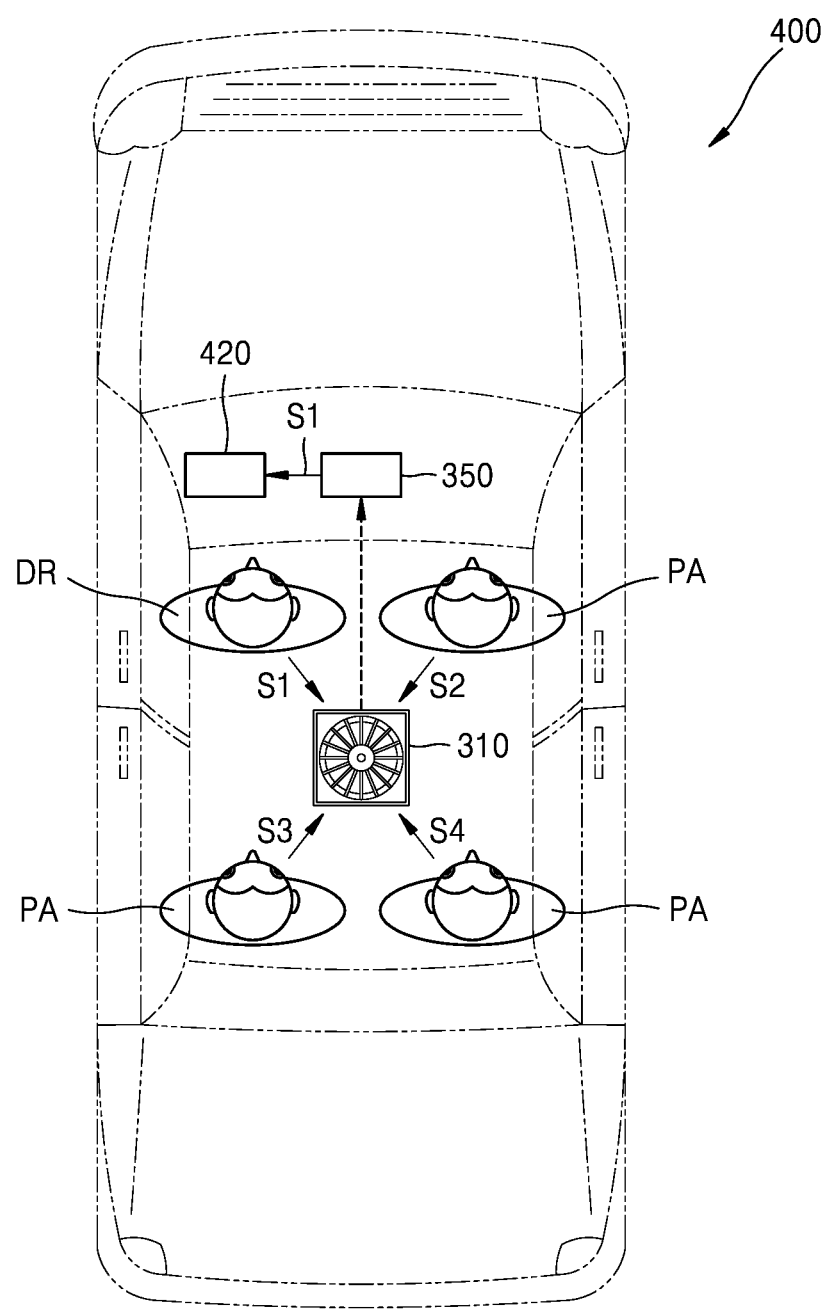
FIG. 22 is a schematic diagram for describing an example of operation of the vehicle voice interface apparatus in a vehicle.

FIG. 21 is a block diagram of a vehicle voice interface apparatus 300 according to an embodiment, and FIG. 22 is a schematic diagram for describing an example of operation of the vehicle voice interface apparatus 300 in a vehicle 400.

Referring to FIG. 21, the vehicle voice interface apparatus 300 may include a sound direction detection sensor 310 and a valid signal extraction module 350. The valid signal extraction module 350 may include a memory configured to store a program for extracting a valid signal, and a processor configured to execute the program. The sound direction detection sensor 310 may include any one of, a modification of, or a combination of the sound direction detection sensors 100, 101, 102, and 103 according to the embodiments described above.

The valid signal extraction module 350 may determine whether a signal received by the sound direction detection sensor 310 is a valid signal, based on a direction thereof, and transmit the signal to a vehicle control module upon determining that the signal is a valid signal. The valid signal extraction module 350 may remove or ignore sound waves from directions other than a direction of a driver, from a sound wave input from various directions, and transmit the sound wave to the vehicle control module.

Referring to FIG. 22, the sound direction detection sensor 310 included in the vehicle 400 detects a sound wave S1 from a driver DR and sound waves S2, S3, and S4 from passengers PA. The sound direction detection sensor 310 may detect directions of the received sound waves S1, S2, S3, and S4 and transmit the detection result to the valid signal extraction module 350. The valid signal extraction module 350 may transmit only the sound wave S1 from the driver DR to a vehicle control module 420.

Figure 23:
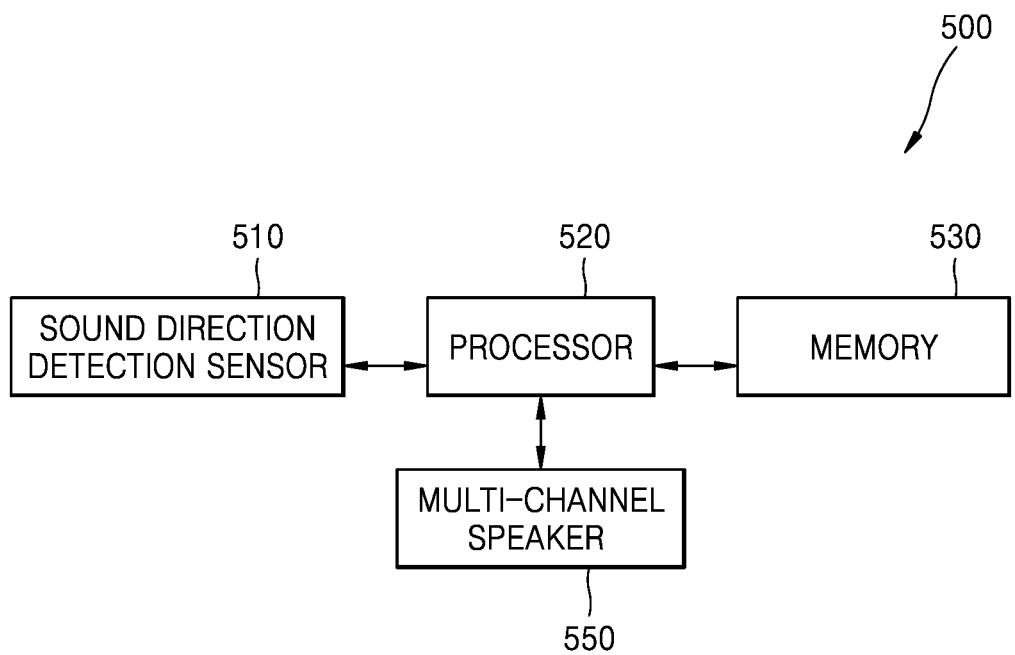
FIG. 23 is a block diagram of a spatial recording apparatus according to an embodiment.

FIG. 23 is a block diagram of a spatial recording apparatus 500 according to an embodiment. Referring to FIG. 23, the spatial recording apparatus 500 according to an embodiment may include a sound direction detection sensor 510, a processor 520 configured to determine a direction of sound input to the sound direction detection sensor 510, by analyzing a signal (e.g., a sound wave) detected by the sound direction detection sensor 510, and a memory 530 configured to store programs for signal processing operations of the processor 520 and execution results of the processor 520. The sound direction detection sensor 510 may include any one of, a modification of, or a combination of the sound direction detection sensors 100, 101, 102, and 103 according to the embodiments described above. The sound direction detection sensor 510 may record ambient sound in association with a direction thereof. The sound direction detection sensor 510 may estimate an input direction of sound in a high resolution.

The spatial recording apparatus 500 may explicitly or selectively record a desired sound source by using the estimation result of the input direction of sound. The spatial recording apparatus 500 may further include a multi-channel speaker 550 to reproduce the recorded sound in accordance with a direction thereof. The processor 520 may control the multi-channel speaker 550 to reproduce a sound wave stored in the memory 530 in accordance with the direction thereof. By reproducing the recorded sound source in accordance with the direction thereof, recorded content may be provided more realistically, immersively, and vividly. The spatial recording apparatus 500 may be used in an augmented reality (AR) or virtual reality (VR) apparatus.

Figure 24:
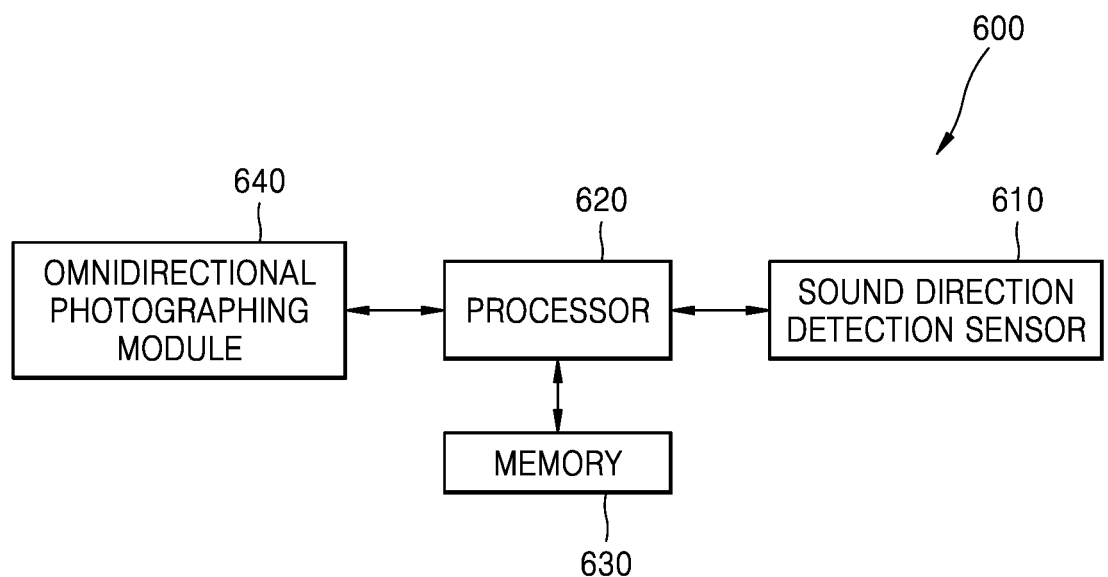
FIG. 24 is a block diagram of an omnidirectional camera according to an embodiment.

FIG. 24 is a block diagram of an omnidirectional camera 600 according to an embodiment. Referring to FIG. 24, the omnidirectional camera 600 according to an embodiment is a camera capable of capturing a panoramic image of objects in all directions. The omnidirectional camera 600 may include a sound direction detection sensor 610, an omnidirectional photographing module 640 (i.e., an omnidirectional camera), a processor 620 configured to control the sound direction detection sensor 610 and the omnidirectional photographing module 640 in such a manner that a directional sound wave detected by the sound direction detection sensor 610 matches an omnidirectional image signal captured by the omnidirectional photographing module 640, and a memory 630 configured to store the directional sound wave and the omnidirectional image signal. The sound direction detection sensor 610 may include any one of, a modification of, or a combination of the sound direction detection sensors 100, 101, 102, and 103 according to the embodiments described above, and may detect sound from all directions and detect directions thereof.

A general panoramic photographing module may be used as the omnidirectional photographing module 640. For example, the omnidirectional photographing module 640 may include optical lenses, an image sensor, etc. in a 360°-rotatable body. Under the control of the processor 620, sound from a direction corresponding to a photographing direction of the omnidirectional photographing module 640 among signals detected by the sound direction detection sensor 610 may be selectively stored in the memory 630. As such, the omnidirectional camera 600 may store a 360° panoramic image signal and a sound wave matching the image signal, in the memory 630. The image and sound waves may be reproduced by a display device including a multi-channel speaker, may maximize a sense of realism, and may be used in an AR/VR device.

Electronic apparatuses according to the embodiments described above may include a processor, a memory configured to store and execute program data, a permanent storage such as a disk drive, a communication port configured to communicate with an external device, and a user interface device, e.g., a touch panel, keys, or buttons.

Methods implemented using software modules or algorithms in the electronic apparatuses according to the embodiments described above may be recorded on a computer-readable recording medium as computer-readable codes or program instructions executable by the processor. Examples of the computer-readable recording medium include magnetic storage media (e.g., ROM, RAM, floppy disks, and hard disks) and optical recording media (e.g., compact disc-ROM (CD-ROM) and digital versatile discs (DVDs)). The computer-readable recording medium may also be distributed over network coupled computer systems so that a computer-readable code is stored and executed in a distributed fashion. The medium may be read by a computer, stored in a memory, and executed by a processor.

It should be understood that embodiments described herein should be considered in a descriptive sense only and not for purposes of limitation. Descriptions of features or aspects within each embodiment should typically be considered as available for other similar features or aspects in other embodiments. It will be understood by one of ordinary skill in the art that various changes in form and details may be made therein without departing from the scope as defined by the following claims.

What is claimed is:

1. A sound direction detection sensor comprising:
a sound inlet configured to receive input sound;
a sound outlet configured to output the input sound that is input through the sound inlet;
a plurality of directional vibrators arranged between the sound inlet and the sound outlet, wherein at least one directional vibrator of the plurality of directional vibrators selectively reacts based on a direction of the input sound that is input through the sound inlet; and
a processor configured to:
identify a directional vibrator having a lowest output in magnitude among the plurality of directional vibrators, and
identify, as an input direction of the input sound, a direction perpendicular to a direction of the identified directional vibrator having the lowest output in magnitude.

2. The sound direction detection sensor of claim 1, wherein the processor is further configured to:
compare a first magnitude of a first output of a first directional vibrator located at a first position at a +90° offset from the direction of the directional vibrator having the lowest output in magnitude with a second magnitude of a second output of a second directional vibrator located at a second position at a −90° offset from the direction of the directional vibrator having the lowest output in magnitude, and
identify a direction of one of the first and second directional vibrators having a greater output in magnitude, to be the input direction of the sound.

3. The sound direction detection sensor of claim 2, wherein each of the first magnitude and the second magnitude is represented by a root-mean-square (RMS) of a vibration waveform of a respective one of the first directional vibrator and the second directional vibrator.

4. The sound direction detection sensor of claim 2, wherein the processor is further configured to:
compare the first magnitude and the second magnitude to a threshold value, and
classify the sound as noise when the first magnitude and the second magnitude are less than the threshold value.

5. The sound direction detection sensor of claim 1, further comprising an omnidirectional vibrator configured to react to the sound regardless of the input direction of the sound.

6. The sound direction detection sensor of claim 5, wherein the processor is further configured to:
compare phases of a first directional vibrator located at a first position at a +90° offset from the direction of the directional vibrator having the lowest output in magnitude and a second directional vibrator located at a second position at a −90° offset from the direction of the directional vibrator having the lowest output in magnitude with to a phase of the omnidirectional vibrator, and identify a direction of a directional vibrator, among the first directional vibrator and the second directional vibrator, having a phase closer to the phase of the omnidirectional vibrator to be the input direction of the sound.

7. The sound direction detection sensor of claim 5, wherein the plurality of directional vibrators and the omnidirectional vibrator are arranged on a same plane with each other, and wherein the plurality of directional vibrators are arranged to surround the omnidirectional vibrator.

8. The sound direction detection sensor of claim 1, wherein the plurality of directional vibrators are arranged on a same plane with each other and are arranged to surround a center point on the same plane that is perpendicular to a central axis located at the sound inlet.

9. The sound direction detection sensor of claim 8, wherein the plurality of directional vibrators are arranged to have symmetry with respect to the center point.

10. The sound direction detection sensor of claim 1, wherein the sound outlet is provided to face all the plurality of directional vibrators.

11. The sound direction detection sensor of claim 1, wherein the sound outlet comprises a plurality of sound outlets respectively facing the plurality of directional vibrators.

12. The sound direction detection sensor of claim 1, wherein the plurality of directional vibrators have a uniform resonant frequency.

13. The sound direction detection sensor of claim 1, wherein the plurality of directional vibrators have non-uniform resonant frequencies.

14. The sound direction detection sensor of claim 13, wherein the plurality of directional vibrators are grouped into a plurality of subgroups representing different directions, and wherein each of the plurality of subgroups comprises directional vibrators having non-uniform resonant frequencies.

15. The sound direction detection sensor of claim 14, wherein the directional vibrators in each of the plurality of subgroups are arranged in an order of resonant frequencies.

16. A sound direction detection method comprising:
receiving input sound by using a plurality of directional vibrators arranged in such a manner that at least one directional vibrator selectively reacts based on a direction of the sound;
identifying a directional vibrator having a lowest output in magnitude among the plurality of directional vibrators; and
identifying, as an input direction of the input sound, a direction perpendicular to a direction of the identified directional vibrator having the lowest output in magnitude.

17. The sound direction detection method of claim 16, wherein the receiving the input sound by using the plurality of directional vibrators comprises calculating a root-mean-square (RMS) of a vibration waveform of each directional vibrator, and wherein a magnitude of an output of each directional vibrator is the RMS of the vibration waveform of each directional vibrator.

18. The sound direction detection method of claim 16, wherein the identifying the input direction of the sound comprises:
selecting a first directional vibrator located at a first position at a +90° offset from the direction of the directional vibrator having the lowest output in magnitude, and a second directional vibrator located at a second position at a −90° offset from the direction of the directional vibrator having the lowest output in magnitude;
comparing a first magnitude of a first output of the first directional vibrator with a second magnitude of a second output of the second directional vibrator; and
identifying a direction of one of the first and second directional vibrators having a greater output in magnitude to be the input direction of the sound.

19. The sound direction detection method of claim 18, further comprising:
comparing the first magnitude and the second magnitude to a threshold value; and
classifying the input sound as noise when the first magnitude and the second magnitude are less than the threshold value.

20. The sound direction detection method of claim 16, further comprising receiving the input sound by using an omnidirectional vibrator that reacts to the input sound regardless of the input direction of the input sound.

21. The sound direction detection method of claim 20, wherein the identifying the input direction of the input sound comprises:
selecting a first directional vibrator located at a first position at a +90° offset from the direction of the directional vibrator having the lowest output in magnitude, and a second directional vibrator located at a second position at a −90° offset from the direction of the directional vibrator having the lowest output in magnitude;
comparing phases of the first directional vibrator and the second directional vibrator to a phase of the omnidirectional vibrator; and
identifying a direction of a directional vibrator, among the first directional vibrator and the second directional vibrator, having a phase closer to the phase of the omnidirectional vibrator to be the input direction of the input sound.

22. An Internet of things (IoT) apparatus comprising:
a sound direction detection sensor configured to receive a voice signal provided by a user;
a memory configured to store one or more application modules; and
a processor configured to execute the one or more application modules,
wherein the sound direction detection sensor comprises:
a sound inlet configured to receive sound;
a sound outlet configured to output the sound that is input through the sound inlet; and
a plurality of directional vibrators arranged between the sound inlet and the sound outlet, wherein at least one directional vibrator of the plurality of directional vibrators selectively reacts based on a direction of the sound that is input through the sound inlet,
wherein the processor is configured to identify, as an input direction of the sound, a direction perpendicular to a direction of a directional vibrator having a lowest output in magnitude among the plurality of directional vibrators.

23. A vehicle voice interface apparatus comprising:
a sound direction detection sensor; and
a valid signal extraction module configured to determine whether a signal received by the sound direction detection sensor is a valid signal, based on a direction of the signal and transmit the signal to a vehicle control module upon determining that the signal is the valid signal,
wherein the sound direction detection sensor comprises:
a sound inlet configured to receive sound;
a sound outlet configured to output the sound that is input through the sound inlet; and
a plurality of directional vibrators arranged between the sound inlet and the sound outlet, wherein at least one directional vibrator of the plurality of directional vibrators selectively reacts based on a direction of the sound that is input through the sound inlet,
wherein the valid signal extraction module is configured to identify, as an input direction of the sound, a direction perpendicular to a direction of a directional vibrator having a lowest output in magnitude among the plurality of directional vibrators.

24. A spatial recording apparatus comprising:
a sound direction detection sensor;
a processor configured to determine an input direction of sound that is input to the sound direction detection sensor, by analyzing a signal detected by the sound direction detection sensor; and
a memory configured to store programs for signal processing operations of the processor and execution results of the processor,
wherein the sound direction detection sensor comprises:
a sound inlet configured to receive the sound;
a sound outlet configured to output the sound that is input through the sound inlet; and
a plurality of directional vibrators arranged between the sound inlet and the sound outlet, wherein at least one directional vibrator of the plurality of directional vibrators selectively reacts based on a direction of the sound that is input through the sound inlet,
wherein the processor is configured to identify, as an input direction of the sound, a direction perpendicular to a direction of a directional vibrator having a lowest output in magnitude among the plurality of directional vibrators.

25. An omnidirectional camera comprising:
a sound direction detection sensor;
an omnidirectional photographing module;
a processor configured to control the sound direction detection sensor and the omnidirectional photographing module in such a manner that a directional sound signal detected by the sound direction detection sensor matches an omnidirectional image signal captured by the omnidirectional photographing module; and
a memory configured to store the directional sound signal and the omnidirectional image signal,
wherein the sound direction detection sensor comprises:
a sound inlet configured to receive sound;
a sound outlet configured to output the sound that is input through the sound inlet; and
a plurality of directional vibrators arranged between the sound inlet and the sound outlet, wherein at least one directional vibrator of the plurality of directional vibrators selectively reacts based on a direction of the sound that is input through the sound inlet,
wherein the processor is configured to identify, as an input direction of the sound, a direction perpendicular to a direction of a directional vibrator having a lowest output in magnitude among the plurality of directional vibrators.

* * * * *